(12) United States Patent
Ono

(10) Patent No.: US 7,881,548 B2
(45) Date of Patent: Feb. 1, 2011

(54) IMAGE PROCESSING METHOD, APPARATUS, AND COMPUTER READABLE RECORDING MEDIUM ON WHICH THE PROGRAM IS RECORDED

(75) Inventor: Shuji Ono, Kanagawa-ken (JP)

(73) Assignee: Fujifilm Corporation (JP)

( * ) Notice: Subject to any disclaimer, the term of this patent is extended or adjusted under 35 U.S.C. 154(b) by 981 days.

(21) Appl. No.: 11/727,381

(22) Filed: Mar. 26, 2007

(65) Prior Publication Data

US 2007/0223830 A1    Sep. 27, 2007

(30) Foreign Application Priority Data

Mar. 27, 2006   (JP) ............................ 2006-084747

(51) Int. Cl.
*G06K 9/40* (2006.01)

(52) U.S. Cl. .................. 382/254; 382/274

(58) Field of Classification Search ............... 382/118, 382/167, 254, 260, 274, 275, 305, 312; 348/240.2; 358/1.2; 345/418
See application file for complete search history.

(56) References Cited

U.S. PATENT DOCUMENTS 5,130,789 A * 7/1992 Dobbs et al. ............... 358/500
7,039,222 B2 * 5/2006 Simon et al. ............... 382/118
2003/0234871 A1 * 12/2003 Squilla et al. ............. 348/220.1

FOREIGN PATENT DOCUMENTS

JP    2000-331180 A    11/2000

OTHER PUBLICATIONS

Cootes et al., "The Use of Active Shape Models for Locating Structures in Medical Images," Image and Vision Computing, vol. 12, No. 6, Jul. 1994, pp. 355-366.
Cootes et al., "Active Appearance Models," Proc. 5th European Conference on Computer Vision, vol. 2, Springer, Germany, 1998, pp. 484-498.

* cited by examiner

*Primary Examiner*—Kanji Patel
(74) *Attorney, Agent, or Firm*—Studebaker & Brackett PC; Donald R. Studebaker

(57) ABSTRACT

Contents of manual retouching performed on a portion of an input image are reflected to the entire portion of the image. Weighting parameters, each representing pre- and post-retouching state of a manually retouched area of a predetermined structure in a retouching target image, and pre-retouching state of the entire portion of the structure, are obtained by applying the area in pre- and post-retouching state, and the entire portion of the structure in pre-retouching state to a model that represents at least the shape of the area or the entire portion of the structure. Then, a parameter representing the entire portion of the structure after the contents of the manual retouching are reflected to the entire portion of the structure is determined based on the obtained weighting parameters, and an image of entirely reconstructed structure is generated based on the determined parameter and the model.

16 Claims, 11 Drawing Sheets

FIG.2

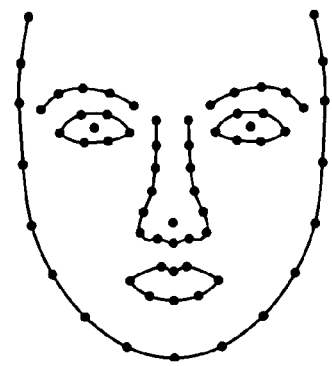
FIG.7
FIG.8
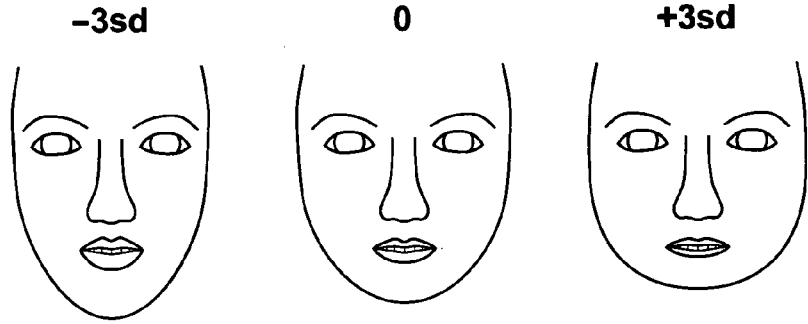
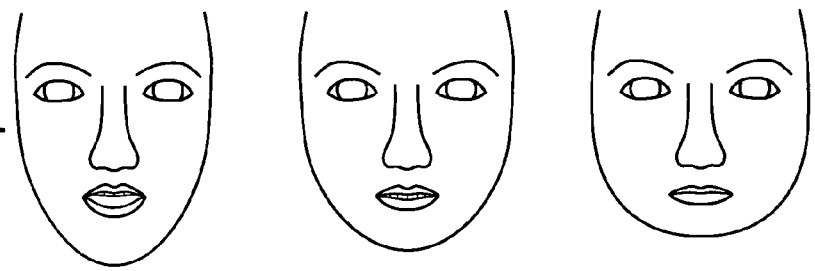

FIG.9
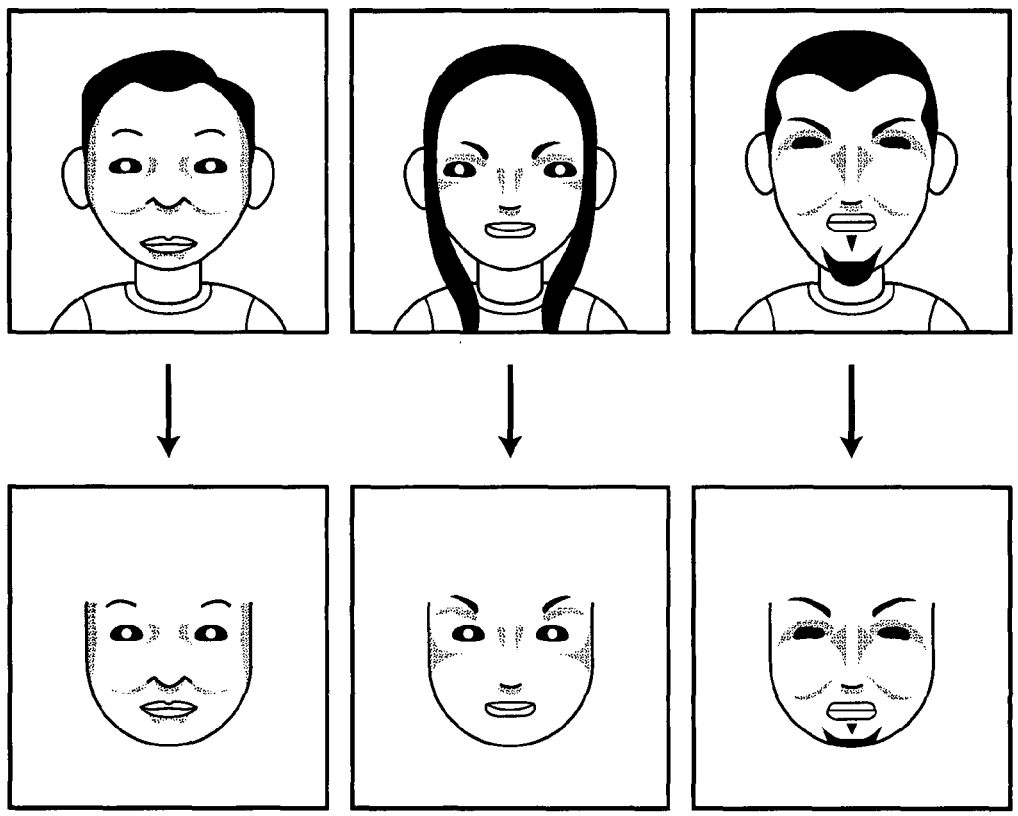
FIG.10
$i^{th}_1$ PRINCIPAL COMPONENT
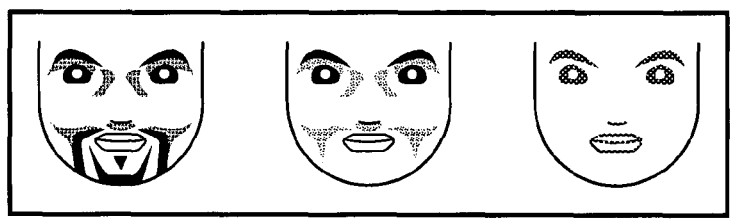
$i^{th}_2$ PRINCIPAL COMPONENT
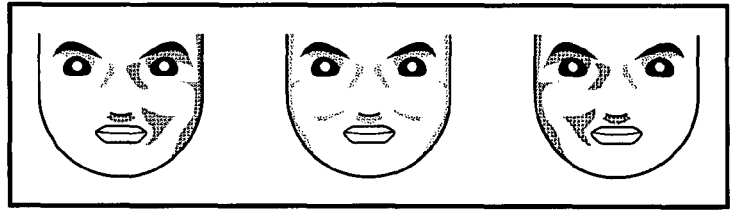

IMAGE PROCESSING METHOD, APPARATUS, AND COMPUTER READABLE RECORDING MEDIUM ON WHICH THE PROGRAM IS RECORDED

BACKGROUND OF THE INVENTION

1. Field of the Invention

The present invention relates to a method and apparatus for performing image processing for retouching a predetermined structure, such as a face or the like, in an image. It also relates to a computer readable recording medium on which a program for causing a computer to perform the method is recorded.

2. Description of the Related Art

Apparatuses that pick up a photograph image and perform processing thereon in various ways, with the image displayed on a screen, and reflect results to the image displayed on the screen are known. The apparatus is realized by causing a computer, such as a personal computer or the like, to perform an image processing program.

Such image processing is called photo retouching, and images are processed in various ways through processing in collaboration with manual operations by a user as described, for example, in Japanese Unexamined Patent Publication No. 2000-331180. The photo retouching includes: white balance, luminance and sharpness corrections, gradually corrected by moving a slide lever or the like displayed on a screen through mouse operation or the like; partial image cut-out, enlargement or reduction by specifying the portion through mouse operation or the like; merging of images; removal of unwanted objects, such as wrinkles or flecks on a face of a person in an image, an electric wire in a landscape image, or the like, which is achieved by painting a pointed portion in the image with a color selected through a predetermined manner using a mouse pointer as a brush or a pencil.

There may be a case that a user wants to perform image retouching first on a portion of a subject in an image using retouching software, then on the other portion according to the partial retouching. Manual performance of all of the retouching, however, requires a prolonged time and skills. For example, when making the face contour of a person in an image thinner, it is tiresome to make both the right and left contours thinner through manual retouching.

SUMMARY OF THE INVENTION

The present invention has been developed in view of the circumstances described above, and it is an object of the present invention to provide an image processing method and apparatus capable of automatically retouching an entire subject in an image without losing naturalness according to retouching manually performed on a partial image element of the subject. It is a further object of the present invention to provide a computer readable recording medium on which a program for causing a computer to perform the method is recorded.

A first image processing method of the present invention is a method including the steps of:

a first parameter obtaining step for obtaining a value of a weighting parameter for representing a predetermined structure in an input image by applying the structure in the input image to a model that represents at least the shape of the structure by a statistical characteristic amount obtained by performing predetermined statistical processing on a plurality of images representing the structure, and a weighting parameter for weighting the statistical characteristic amount according to an individual characteristic of the structure;

an image retouching step for retouching a portion of the structure in the input image;

a second parameter obtaining step for obtaining a value of the weighting parameter for representing the portion of the structure in the input image before the retouching by applying the portion of the structure in the pre-retouching input image to the model;

a third parameter obtaining step for obtaining a value of the weighting parameter for representing the portion of the structure in the input image after the retouching by applying the portion of the structure in the post-retouching input image to the model;

a fourth parameter obtaining step for obtaining a value of the weighting parameter for representing the entire portion of the structure after the retouching is reflected to the entire portion of the structure by the model based on the value of the weighting parameter obtained by the first parameter obtaining step, and the variation from the value of the weighting parameter obtained by the second parameter obtaining step to the value of the weighting parameter obtained by the third parameter obtaining step; and an image reconstruction step for reconstructing an output image representing the structure after the retouching is reflected to the entire portion of the structure by substituting the value of the weighting parameter obtained by the fourth parameter obtaining step to the model.

A second image processing method of the present invention is a method including the steps of:

a first parameter obtaining step for obtaining a value of an overall parameter for representing a predetermined structure in an input image by applying the structure in the input image to an overall model that represents at least the shape of the structure by a statistical characteristic amount obtained by performing predetermined statistical processing on a plurality of images representing the entire portion of the structure, and an overall parameter for weighting the statistical characteristic amount according to an individual characteristic of the entire portion of the structure;

an image retouching step for retouching a portion of the structure in the input image;

a second parameter obtaining step for obtaining a value of a partial parameter for representing the portion of the structure in the input image before the retouching by applying the portion of the structure in the pre-retouching input image to a partial model that represents at least the shape of the portion of the structure by a statistical characteristic amount obtained by performing predetermined statistical processing on a plurality of images representing the portion of the structure, and a partial parameter for weighting the statistical characteristic amount according to an individual characteristic of the portion of the structure;

a third parameter obtaining step for obtaining a value of the partial parameter for representing the portion of the structure in the input image after the retouching by applying the portion of the structure in the post-retouching input image to the partial model;

a fourth parameter obtaining step for obtaining a value of the overall parameter for representing the entire portion of the structure after the retouching is reflected to the entire portion of the structure by the overall model based on the value of the overall parameter obtained by the first parameter obtaining step, and the variation from the value of the partial parameter obtained by the second parameter obtaining step to the value of the partial parameter obtained by the third parameter obtaining step; and an image reconstruction step for reconstructing an output image representing the entire portion of the structure after the retouching is reflected to the entire portion of the structure by substituting the value of the overall parameter obtained by the fourth parameter obtaining step to the overall model.

A first image process apparatus of the present invention is an apparatus for realizing the first image processing method described above. That is, the apparatus includes:

a first parameter obtaining means for obtaining a value of a weighting parameter for representing a predetermined structure in an input image by applying the structure in the input image to a model that represents at least the shape of the structure by a statistical characteristic amount obtained by performing predetermined statistical processing on a plurality of images representing the structure, and a weighting parameter for weighting the statistical characteristic amount according to an individual characteristic of the structure;

an image retouching means for retouching a portion of the structure in the input image;

a second parameter obtaining means for obtaining a value of the weighting parameter for representing the portion of the structure in the input image before the retouching by applying the portion of the structure in the pre-retouching input image to the model;

a third parameter obtaining means for obtaining a value of the weighting parameter for representing the portion of the structure in the input image after the retouching by applying the portion of the structure in the post-retouching input image to the model;

a fourth parameter obtaining means for obtaining a value of the weighting parameter for representing the entire portion of the structure after the retouching is reflected to the entire portion of the structure by the model based on the value of the weighting parameter obtained by the first parameter obtaining means, and the variation from the value of the weighting parameter obtained by the second parameter obtaining means to the value of the weighting parameter obtained by the third parameter obtaining means; and an image reconstruction means for reconstructing an output image representing the structure after the retouching is reflected to the entire portion of the structure by substituting the value of the weighting parameter obtained by the fourth parameter obtaining means to the model.

A second image process apparatus of the present invention is an apparatus for realizing the second image processing method described above. That is, the apparatus includes:

a first parameter obtaining means for obtaining a value of an overall parameter for representing a predetermined structure in an input image by applying the structure in the input image to an overall model that represents at least the shape of the structure by a statistical characteristic amount obtained by performing predetermined statistical processing on a plurality of images representing the entire portion of the structure, and an overall parameter for weighting the statistical characteristic amount according to an individual characteristic of the entire portion of the structure;

an image retouching means for retouching a portion of the structure in the input image;

a second parameter obtaining means for obtaining a value of a partial parameter for representing the portion of the structure in the input image before the retouching by applying the portion of the structure in the pre-retouching input image to a partial model that represents at least the shape of the portion of the structure by a statistical characteristic amount obtained by performing predetermined statistical processing on a plurality of images representing the portion of the structure, and a partial parameter for weighting the statistical characteristic amount according to an individual characteristic of the portion of the structure;

a third parameter obtaining means for obtaining a value of the partial parameter for representing the portion of the structure in the input image after the retouching by applying the portion of the structure in the post-retouching input image to the partial model;

a fourth parameter obtaining means for obtaining a value of the overall parameter for representing the entire portion of the structure after the retouching is reflected to the entire portion of the structure by the overall model based on the value of the overall parameter obtained by the first parameter obtaining means, and the variation from the value of the partial parameter obtained by the second parameter obtaining means to the value of the partial parameter obtained by the third parameter obtaining means; and an image reconstruction means for reconstructing an output image representing the entire portion of the structure after the retouching is reflected to the entire portion of the structure by substituting the value of the overall parameter obtained by the fourth parameter obtaining means to the overall model.

First and second computer readable recording media of the present invention are media on which programs for causing a computer to perform each of the steps of the first and second image processing methods are recorded respectively.

The image processing methods, apparatuses, and programs will now be described in detail.

Specific examples of the "model" in the first aspect of the present invention, and the "overall model" and "partial model" in the second aspect of the present invention (hereinafter, simply referred to as "model" in the description common to each model) include those that use AMS (Active Shape Models) and AAM (Active Appearance Models) schemes. The ASM and ARM are one of the approaches for trying to interpret image contents based on a model. For example, if a face is the interpretation target object, a mathematical model of a face is generated by performing a principal component analysis on the shapes of the face portions of a plurality of learning images in ASM, or on the shapes and luminance after normalization of the shapes in AAM. Then, a face portion in a new input image is represented by each of the principal components of the model and a weighting parameter for each of the principal components to reconstruct the face image. The ASM is described in a non-patent literature "The Use of Active Shape Models for Locating Structures in Medical Images" by T. F. Cootes et al., Image and Vision Computing, Vol. 12, No. 6, pp. 355-366, 1994 (reference document 1), and AAM is described in a non-patent literature "Active Appearance Models" by T. F. Cootes et al., In Proc. 5th European Conference on Computer Vision, Springer, Germany, vol. 2, pp. 484-498, 1998 (reference document 2).

Preferably, the "predetermined structure" is a structure appropriate for modeling, i.e., the variations in the shape or luminance of the structure in an image fall within a certain range. In particular, a structure from which a statistical characteristic amount having a higher level of explanatory power for the shape or luminance thereof is derived by performing statistical processing thereon is preferable. One of the specific examples is a human face.

As for the "predetermined statistical processing", a dimension compression processing capable of representing the structure by compressing it to a statistical amount with the number of dimensions less than the number of pixels representing the structure is preferable. A specific example may be a multivariate statistical technique, such as the principal component analysis or the like. If the principal component analysis is performed as the "predetermined statistical processing", the "statistical characteristic amount" means a plurality of principal components obtained by the principal component analysis.

The level of the explanatory power described above means that a higher order principal component has a higher level of explanatory power, and a lower order principal component has a lower level of explanatory power, taking the case where the predetermined statistical processing is the principal component analysis as an example.

"A (predetermined) structure in an input image" may be detected automatically or manually. Further, the present invention may further includes a process (means) for detecting the structure in the input image, or the area of the structure detected from the input image in advance may be used as input for performing the application to the model.

The referent of "applying the structure (portion thereof) to (a model)" as used herein means arithmetic operations or the like for representing the structure in the image by the model. More specifically, it means to obtain the value of a weighting parameter for weighting each of the principal components of the mathematical model, taking the case where the AAM is used as an example.

Further, the model of the present invention may be provided for each of a plurality of attributes of the predetermined structure. In this case, a process (means) for obtaining an attribute of the structure in the input image and selecting the model according to the obtained attribute may be added, and applying the predetermined structure in the input image to the selected model. Here, the "attribute" means, for example, gender, age, race, or the like if the predetermined structure is a human face. It may be information for identifying an individual. In this case, the attribute-based models mean individual-based models. The specific means for obtaining the attribute may include any known image recognition method (e.g., method described in Japanese Unexamined Patent Publication No. 11 (1999)-175724), or presumption/obtaining from auxiliary information of an image, such as GPS information or the like.

The referent of "retouching a portion of the structure in the input image" as used herein means to change the shape and/or luminance of the portion of the structure. The "retouching" may be performed manually by the user through a mouse or keyboard operation.

The "the variation from the value of the weighting parameter (partial parameter) obtained by the second parameter obtaining step (means) to the value of the weighting parameter (partial parameter) obtained by the third parameter obtaining step (means)" is the change in the shape and/or luminance of the portion of the structure made by the image retouching step (means) represented by the weighting parameter (partial parameter) for the "model" of the present invention. For example, the variation may be represented by the difference or ratio between the values of the weighting parameter (partial parameter) before and after the retouching.

The referent of "obtaining a value of the weighting parameter (overall parameter) for representing the entire portion of the structure after the retouching is reflected to the entire portion of the structure by the model (overall model) based on the value of the weighting parameter (overall parameter) obtained by the first parameter obtaining step (means)", and the "variation" in the value of the weighting parameter described above, as used herein means to obtain "the value of the weighting parameter (overall parameter) for representing the entire portion of the structure after the retouching is reflected to the entire portion of the structure by the model (overall model)" from the value of the weighting parameter (overall parameter) obtained by the first parameter obtaining step (means) and the "variation" in the value of the weighting parameter described above before and after the retouching based on, for example, a function or a reference table obtained in advance, which represents the correlation between the change in the portion of the structure and the change in the entire portion of the structure when the change in the shape and/or luminance of the portion of the structure made by the retouching is reflected to the entire portion of the structure as the correlation between the weighting parameter (partial parameter) for representing the portion of the structure and the weighting parameter (overall parameter) for representing the entire portion of the structure before and after the retouching.

According to the image processing methods, apparatuses and computer readable recording media on which the programs therefor are recorded, in the fourth parameter obtaining step (means), a value of a weighting parameter for representing the entire portion of a predetermined structure after the retouching is reflected to the entire portion of the structure by a model (overall model) is obtained based on a weighting parameter (overall parameter) for representing the structure before the retouching by a predetermined model obtained by the first parameter obtaining step (means), a weighting parameter (partial parameter) for representing a retouching target portion of the structure before the retouching obtained by the second parameter obtaining step (means), and a weighting parameter (partial parameter) for representing the retouching target portion of the structure after the retouching obtained by the third parameter obtaining step (means); and, an output image representing the entire portion of the structure after the retouching performed by the image retouching step (means) is reflected to the entire portion of the structure by substituting the value of the weighting parameter obtained by the fourth parameter obtaining step (means) to the (overall) model in the image reconstruction step (means). Thus, in a case where user wants to retouch a portion of a predetermined structure in an image, and then to retouch the other portion according to the partial retouching, the user does not need to manually retouch the other portion, so that the retouching time may be reduced, and high skills for the retouching are not required.

Further, the retouching performed on a portion of the predetermined structure is reflected to the entire portion using the weighting parameters in the model representing the predetermined structure, so that the entire portion of the structure may be retouched in natural finish without departing from the scope of the naturalness of the predetermined structure represented by the model.

Still further, If an arrangement is adopted in which: the model of the present invention is provided for each of a plurality of attributes of a predetermined structure; a process (means) for obtaining an attribute of the structure in an input image and selecting a model corresponding to the obtained attribute is added; and the predetermined structure is applied to the selected model, then the structure in the input image may be applied to a more appropriate model, thereby the processing accuracy may be improved and a higher quality image may be obtained.

BRIEF DESCRIPTION OF THE DRAWINGS

FIG. 2 illustrates an example image list display screen of the photo image viewer.

FIG. 7 illustrates example characteristic points set on a face.

FIG. 8 schematically illustrates the variation in face shapes when the value of the weighting factor for a unique vector of a principal component obtained by a principal component analysis for a face shape is varied.

FIG. 9 illustrates that the face shapes in sample images are transformed into an average face shape, and indicating the luminance thereof under the average face shape.

FIG. 10 schematically illustrates the variation in face luminance when the value of the weighting factor on a unique vector of a principal component obtained by principal component analysis for face luminance is varied.

DESCRIPTION OF THE PREFERRED EMBODIMENTS

Hereinafter, exemplary embodiments of the present invention will be described by way of example, in which the image processing method (automatic retouching) of the present invention is implemented as one of the functions of a photo image viewer, with reference to the accompanying drawings.

The photo image viewer is a personal computer (PC) of a user with an auxiliary storage, such as a hard disk or the like, having therein photo image viewer software including an image processing program for causing a computer to perform the image processing method of the present invention, which is stored therein by installing each program, setting file, and the like, from a recording medium, such as a CD-ROM or the like, having recorded thereon the software including the image processing program to the PC. The image processing of the present invention is realized by executing the image processing program on the PC. Note that the installation of the retouching software may be performed by downloading the software through a network, such as the Internet or the like.

Each of the programs, such as the image processing program of the present invention, and the like, constituting the photo image viewer software is an event-driven program executed in response to an event, such as a mouse click by the user, a processing request from another program, or the like, and is written in a programming language that supports GUI and event driven program format, such as Visual Basic (R) or the like.

Figure 1:
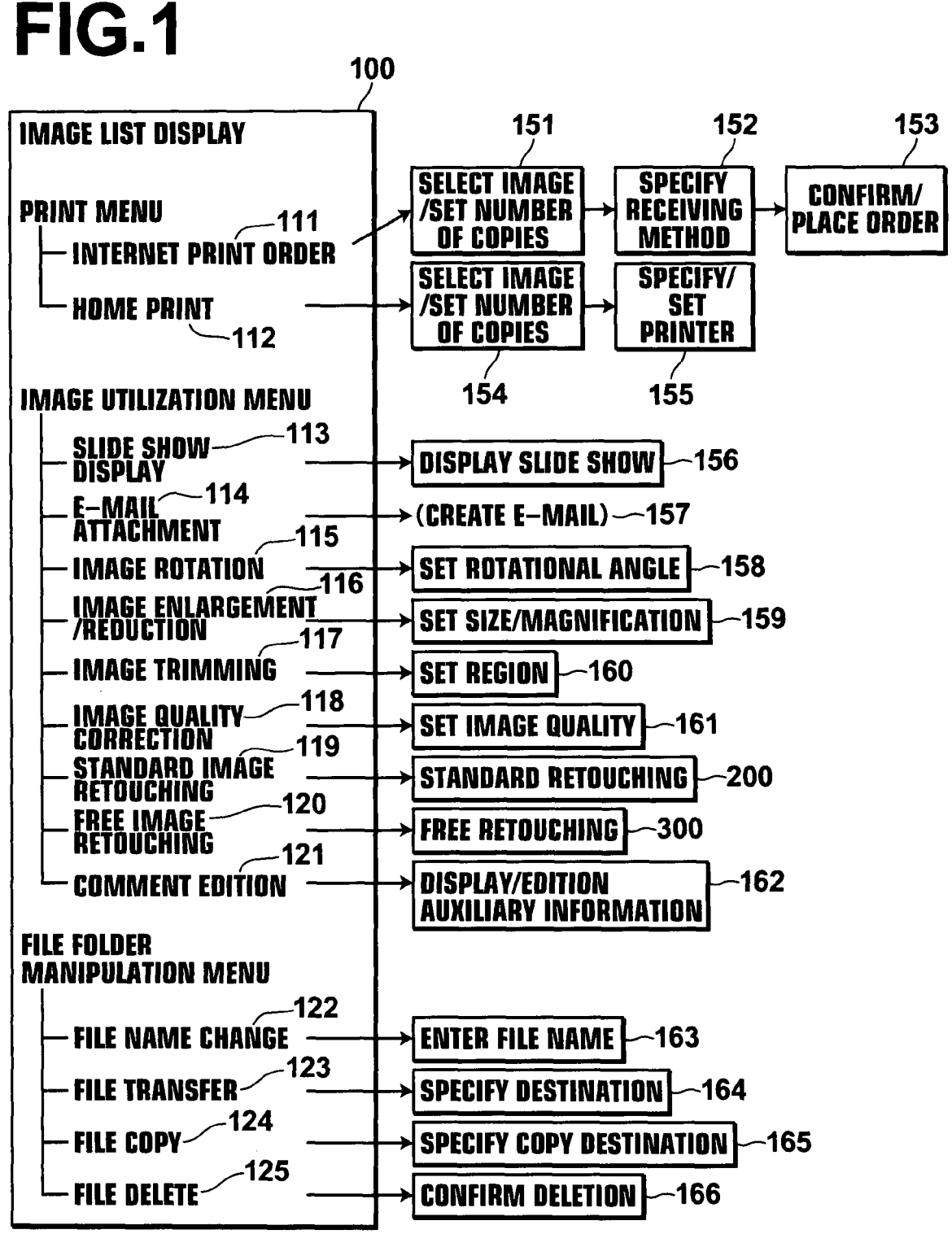
FIG. 1 is a screen transition diagram of the photo image viewer of an embodiment of the present invention.

FIG. 1 is a screen transition diagram of the photo image viewer of the present invention. When the photo image viewer is activated, an image list screen 100 is initially displayed, and then a screen (one of 151 to 166, 200, or 300) is displayed according to a selected menu in the image list screen 100.

Figure 2:
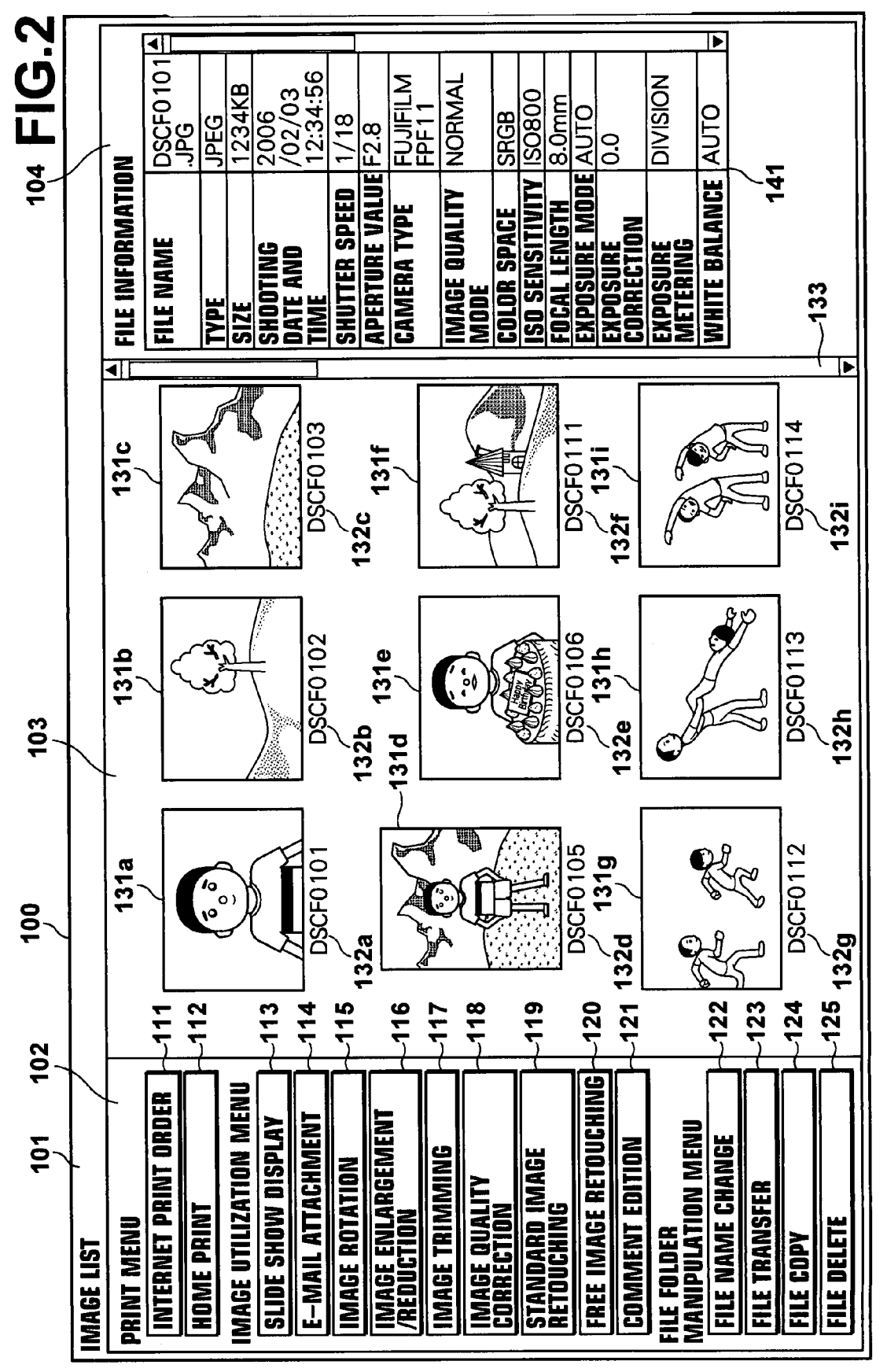

FIG. 2 illustrates an example of the image list screen 100 which is initially displayed when the photo image viewer of the present invention is activated. As illustrated, the image list screen 100 includes a title bar 101, a menu frame 102, a thumbnail frame 103, and an auxiliary information frame 104. The menu frame 102 includes command buttons 111 to 125 associated with functions selectable by the user. The thumbnail frame 103 includes image areas 131a to 131i for displaying thumbnail images, label areas 132a to 132i for indicating the file names of the thumbnail images, and a scrollbar 133. The auxiliary information frame 104 includes a list box 141 for list displaying auxiliary information of an image file.

When the photo image viewer is activated, image files stored in a predetermined folder (logical storage location) are sequentially read into the image areas 131a to 131i of the thumbnail frame 103 based on the initial file setting, and images reduced to the size of the image areas are displayed therein. At the same time, file names, each corresponding to each image displayed in the corresponding image area, are displayed in the label areas 132a to 132i. If the source folder includes more than ten image files, a new image file is read into the image area and the display in the image areas 131a to 131i and label areas 132a to 132i are updated according to scrolling of the scrollbar 133. Image selection is performed by clicking on one or more image areas by the user. Here, in response to the click event occurred in the image area, the file name of the image displayed in the image area is stored in a predetermined region (image file memory) of the main memory of the PC, and if the selected image (file) is treated in the subsequent processing, the file name of the target processing image is obtained from the image file memory. The region for storing the file names is defined as list structure to allow selection of a plurality of images.

A program coded to load an object to be displayed on the next screen to the predetermined region of the main memory of the PC in response to the occurrence of a click event on each of the command buttons, i.e., detection of a click of each of the command buttons 111 to 125 through a mouse operation by the user, and to display the screen is associated with each of the command buttons 111 to 125 of the menu frame 102. When the user clicks a desired command button, the program associated with the button is executed, and the screen transition shown in FIG. 1 is performed.

More specifically, when a click event occurs on "Internet Print Order" button 111 of the print menu, an image selection/number of copy setting screen 151 for selecting images for ordering and setting the number of copies for each of the images is loaded and displayed, and the selection and setting operations are performed according to the contents of the image selection/number of copy setting screen 151. Then, if an instruction to display the next screen is given by the click of a predetermined button or the like, a receiving method specifying screen 152 for receiving photograph prints (photo-labo, convenience store, or home delivery) is loaded and displayed. After the specifying operation is performed according to the contents of the receiving method specifying screen 152, if an instruction to display the next screen is given, a confirmation/ordering screen 153 for final confirmation of the ordering and actual placement of the order is displayed. When a click event occurs on "Home Print" button 112, an image selection/number of copy setting screen 154 for selecting images for ordering and setting number of copies for each of the images is loaded and displayed. After the selection and setting operations are performed according to the contents of the image selection/number of copy setting screen 154, if an instruction to display the next screen is given, a printer specifying/setting screen for specifying a printer for the printing, and setting printing conditions is loaded and displayed.

In the image utilization menu, if a click event occurs on the "Slide Show Display" button 113, a slide show display screen for sequentially displaying image files read in from the predetermined folder in slide show format is loaded and displayed. After an image is selected by the user by clicking on a desired image area of the thumbnail images (one of the image areas 131a to 131i) in the thumbnail frame 103, if a click event occurs on "E-mail Attachment" button 114, an e-mail creation screen 157 of the e-mail software installed in the PC is loaded and displayed, with the file of a selected image being attached thereto. If a click event occurs on "Image Rotation" button 115, a rotation angle setting screen 158 for selecting/inputting a rotation angle for a selected image is loaded and displayed. Similarly, if a click event occurs on "Image Enlargement/Reduction" button 116, a size/magnification setting screen 159 for selecting/inputting the size of a selected image after conversion or magnification ratio is loaded and displayed. If a click event occurs on "Trimming" button 117, a region setting screen 160 for specifying a cut-out region from a selected image is loaded and displayed, and if a click event occurs on "Image Quality Correction" button 118, an image quality setting screen 161 for correcting luminance, sharpness, white balance, and contrast is loaded and displayed. If a click event occurs on "Standard Image Retouching" button 119, a standard retouching screen 200 (FIG. 3) for setting standard retouching on a selected image, described later, is loaded and displayed. If a click event occurs on "Free Image Retouching" button 120, a free retouching screen 300 (FIG. 4) for performing non-standard retouching on a selected image, described later, is loaded and displayed, and if a click event occurs on"Comment Edition" button 121, an auxiliary information display/editing screen 162 for inputting/editing a comment to be attached to a selected image is loaded and displayed.

The file folder manipulation menu includes command buttons 122 to 125 for performing operations on the file of an image selected by the user by clicking on a desired image area of the thumbnail images (131a to 131i) in the thumbnail frame 103. More specifically, if a click event occurs on "File Name Change" button 122, a file name input screen 163 for editing the filename of a selected image is loaded and displayed, and if a click event occurs on"File Transfer" button 123, a destination specifying screen 164 for selecting/inputting a destination folder for a selected image is loaded and displayed. If a click event occurs on "File Copy" button 124, a copy destination specifying screen 165 for specifying a copy destination folder for a selected image is loaded and displayed, and if a click event occurs on "File Delete" button 125, a delete confirmation screen 166 for confirming deletion of a selected image is loaded and displayed.

Auxiliary information (tag information of Exif) of an image selected in the thumbnail frame 103 is read into the list box 141 of the auxiliary information frame 141 from the image file and list displayed.

Figure 3:
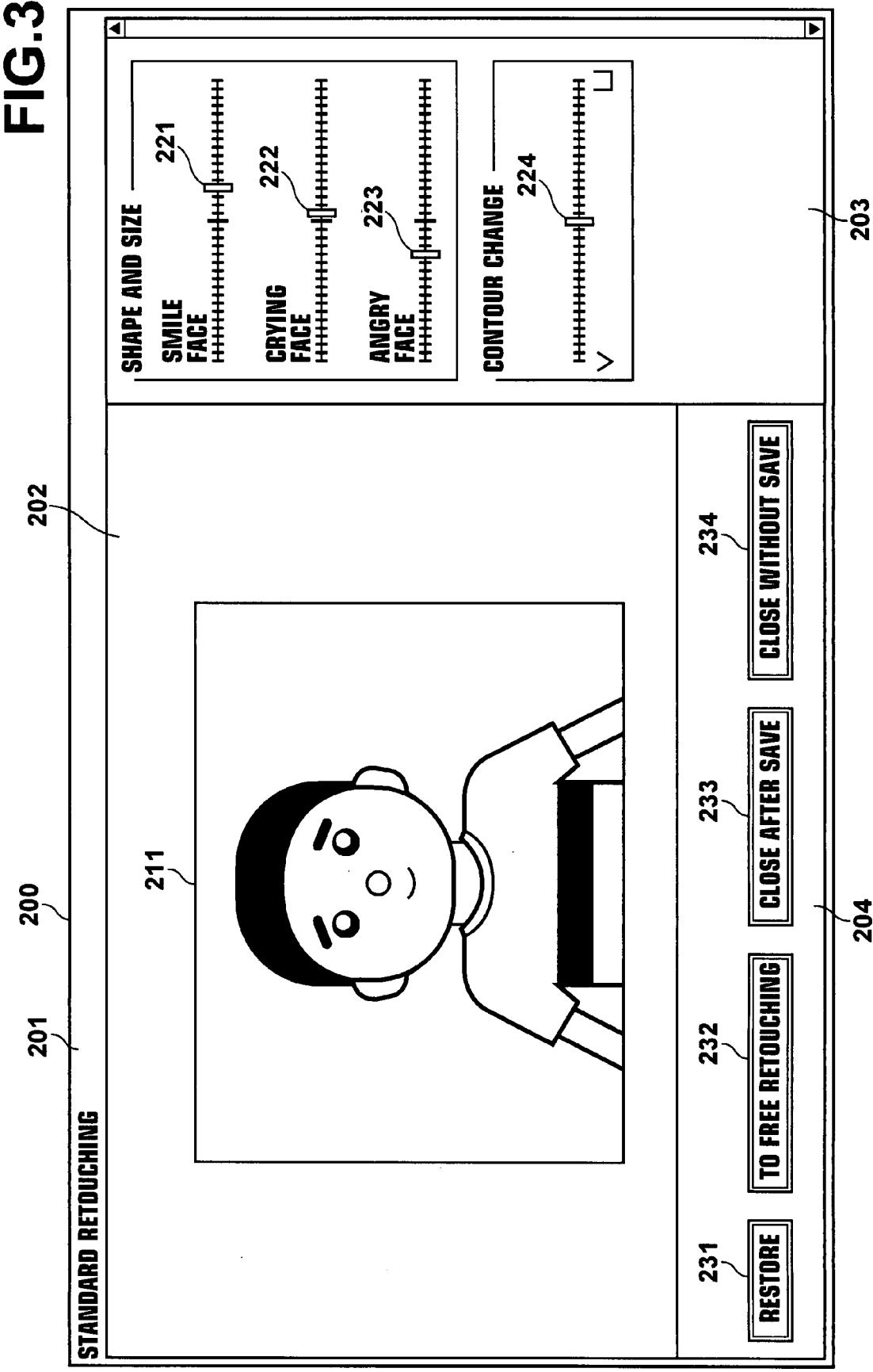
FIG. 3 illustrates an example standard retouching screen of the photo image viewer.

FIG. 3 illustrates an example standard retouching screen 200 loaded and displayed in response to a click event occurred on "Standard Image Retouching" button 119. As illustrated, the standard retouching screen 200 includes a title bar 201, an image frame 202, a retouching amount adjustment frame 203, and a control frame 204. The image frame 202 includes an image area 211 for displaying a retouching target image, and the retouching amount adjustment frame 203 includes slide levers 221 to 224 for adjusting amounts of retouching in the standard retouching operations. The control frame 204 includes command buttons 231 to 234 for controlling retouching operation and the like.

The image displayed in the image area 211 of the image frame 202 is the image displayed in the selected image area (e.g., 131a) of the thumbnail frame 103 of the image list screen 100. The file name of the image is obtained from the image file memory, then the file having the file name is read in, and the image is displayed based on the image data included in the file.

When a moving event occurs on each of the slide levers 221 to 224 of the retouching adjustment frame 203, the value of each weighting parameter for weighting each principal component of a mathematical model of face image, described later, is changed according to an amount of movement of the lever, the image in the image area 211 is reconstructed based on the changed parameter value and displayed.

In the control frame 204, if a click event occurs on "Restore" button 231, the image displayed in the image area 211 is restored to the original pre-retouching state and redisplayed. More specifically, the region in the main memory of the PC for storing image data of an image to be displayed in the image area 211 has storage areas for two images, and the image data of an original image are stored as they are in one of the areas, and the image data of a retouched image are stored in the other area. In response to the occurrence of the click event on "Restore" button 231, the image data before retouching is read into the image area 211 from the former storage area and the image therein is updated. If a click event occurs on "To Free Retouching" button 232, the free retouching screen 300 (FIG. 4) for performing non-standard retouching, described later, on the image displayed in the image area 211 is loaded and displayed. Further, if a click event occurs on "Close after Save" button 233, the file contents of the retouching target image are replaced by the image data representing the image currently displayed in the image area 211, and the standard retouching screen 200 is closed. If a click event occurs on "Close without Save" button 234, the image currently displayed in the image area 211 is discarded, and the standard retouching screen 200 is closed without changing the file contents of the retouching target image. The referent of "screen is closed" as used herein means that the region in the main memory where the object of the screen is stored is released.

Figure 5:
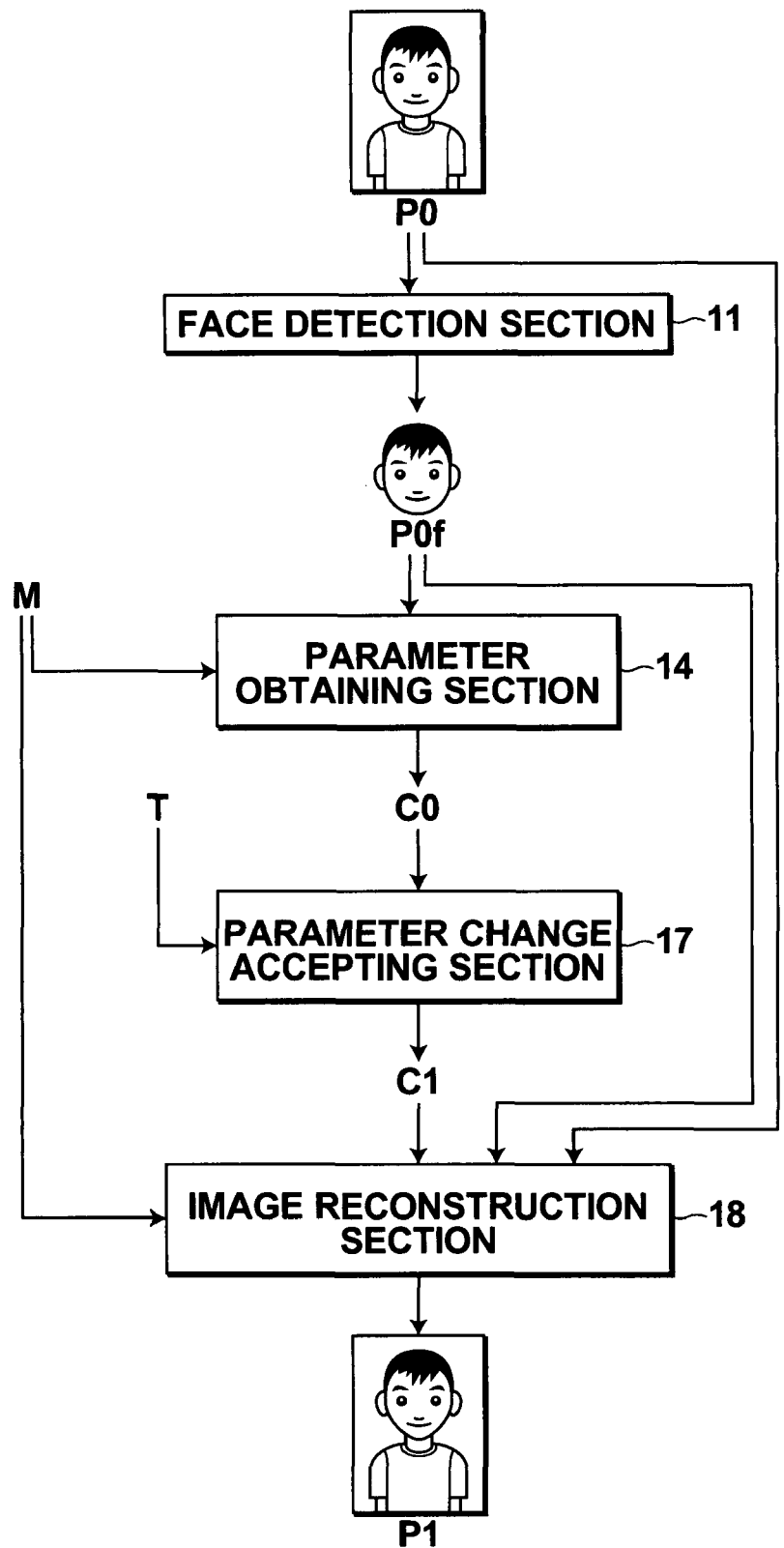
FIG. 5 is a block diagram schematically illustrating the configuration and data flow of a standard image retouching process using a mathematical model of face image.

FIG. 5 is a block diagram schematically illustrating the configuration and data flow of a standard image retouching process performed based on user operations in the standard retouching screen 200. As illustrated, the standard retouching process is realized by: a face detection section 11 for detecting a face portion $P0f$ in an image $P0$ displayed in the image area 211; a parameter obtaining section 14 for obtaining a weighting parameter $C0$ by applying the detected face portion $P0f$ to a mathematical model M generated by AAM (reference document 2) based on a plurality of sample images representing human face portions, the weighting parameter $C0$ being used for weighting a principal component constituting the mathematical model M and corresponding to a unique characteristic of the face portion $P0f$; a parameter change accepting section 17 for accepting a moving operation of the slide levers (221 to 224) moved by the user, and obtaining a weighting parameter $C1$ corresponding to the position of the lever after moved based on a reference table T that defines correlation between the position of the lever and the value of the weighting parameter; and an image reconstruction section 18 for generating an image $P1f$ of restructured face portion based on the changed parameter $C1$ and the mathematical model M, and generating an image P1, which is the image P0 with the face portion P0f replaced by the reconstructed face portion P1f.

Figure 6:
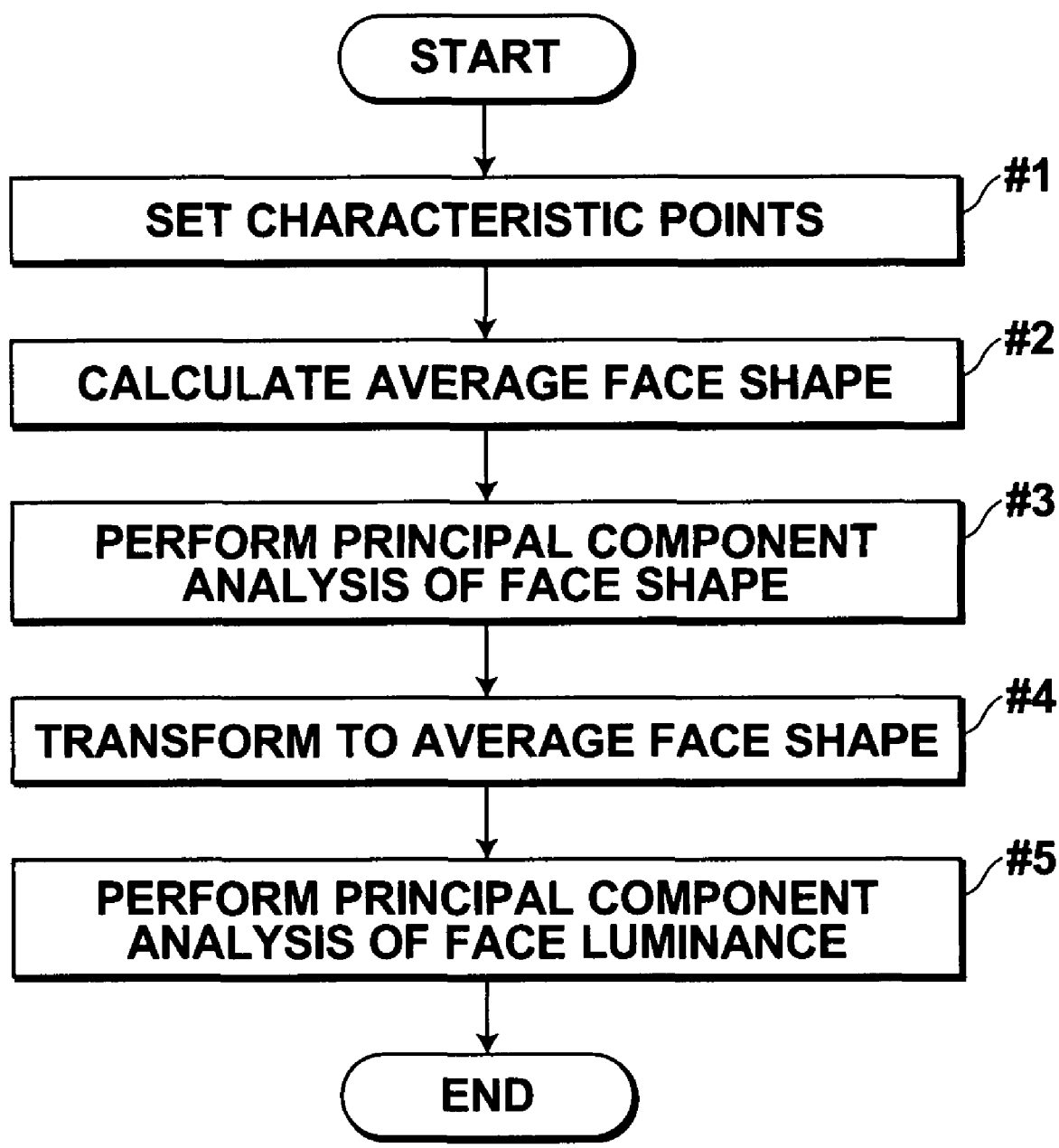
FIG. 6 is a flowchart illustrating a process flow for generating a mathematical mode of face image.

The mathematical model M is generated based on the flowchart shown in FIG. 6 and pre-installed together with the programs described above. A generation process of the mathematical model M will now be described.

First, characteristic points representing a face shape are set on each of a plurality of face images (sample images) as shown in FIG. 7 (step #1). Here, the number of characteristic points is 122 (FIG. 7 indicates only 60 characteristic points for clarity) Location of each of the characteristic points is predefined like, for example, the first characteristic point is at the left end of the left eye, the $38^{th}$ characteristic point is at the midpoint between the eyebrows, and the like. Each characteristic point may be set either manually or automatically through a recognition process. It may be corrected manually as required after automatic setting.

Then, an average face shape is calculated based on the characteristic points set on each of the sample images (step #2). More specifically, average values of position coordinates of the characteristic points representing the same region on the respective sample images are obtained.

Further, a principal component analysis is performed based on the characteristic points representing the face shape in each of the sample images and the position coordinates of the average face shape (step #3). As a result, any face shape may be approximated by formula (1) below.

$$S = S_0 + \sum_{i=1}^{n} p_i b_i \quad (1)$$

where: S is the shape vector on which the position coordinates of each characteristic point of a face shape are arranged $(x_1, y_1, ---x_{122}, y_{122})$; $S_0$ is the average face shape vector on which the position coordinates of each characteristic point on the average face shape are arranged; $p_i$ is a unique vector representing the $i^{th}$ principal component of the face shape obtained by the principal component analysis; and $b_i$ is a weighting factor for each unique vector $p_i$. FIG. 8 schematically illustrates how the face shape varies when the values of the weighting factors $b_1$ and $b_2$ for the unique vectors $p_1$ and $p_2$ of the top two principal components obtained by the principal component analysis are varied. The variation width is from −3 sd to +3 sd, which is based on the standard deviation sd of the values of the weighting factors $b_1$ and $b_2$ when the face shape of each sample image is represented by formula (1) above. The face shape in the center of the three face shapes in each principal component is the average face shape. This example shows that a component contributing to the contour shape of the face is derived as the first principal component as a result of the principal component analysis, and the face shape varies from an elongated face (−3 sd) to a round face (+3 sd) by varying the weighting factor $b_1$. Similarly, components contributing to open/close states of the mouth and jaw length are derived as the second principal component, and the face shape varies from a face with long jaw and open mouth (−3 sd) to a face with short jaw and closed mouth (+3 sd) by varying the weighting factor $b_2$. Note that a smaller value of i has stronger explanatory power of the shape. That is, it means a greater contribution to the face shape.

Next, each of the sample images is transformed (warped) to the average face shape obtain in step #2 (step #4). More specifically, the amount of shift for each of the characteristic points between each of the sample images and the average face shape is calculated, and based on the calculated amount of shift, an amount of shift of each of the sample images to the average face shape on a pixel basis is calculated by formulae (2) to (5) (two dimensional quintic polynomial) below, and each of the sample images is warped to the average face shape on a pixel basis.

$$x' = x + \Delta x \quad (2)$$

$$y' = y + \Delta y \quad (3)$$

$$\Delta x = \sum_{i=0}^{n} \sum_{j=0}^{n-i} a_{ij} \cdot x^i \cdot y^j \quad (4)$$

$$\Delta y = \sum_{i=0}^{n} \sum_{j=0}^{n-i} b_{ij} \cdot x^i \cdot y^j \quad (5)$$

where: x and y are the coordinates of each characteristic point in each sample image; x' and y' are coordinates on the average face shape to be warped; $\Delta x$ and $\Delta y$ are amounts of shift to the average shape; "n" is the order; and $a_{ij}$ and $b_{ij}$ are coefficients. The coefficients for polynomial approximation are obtained by the least squares method. Here, for a pixel whose coordinate value after warping is not an integer value, and moved to a position including a fractional part, the pixel value thereof is obtained from four adjacent pixels by first order approximation. That is, the pixel value thereof is distributed to four surrounding pixels in proportion to the distance between the coordinate thereof to each of the pixels after warping. FIG. 9 illustrates that face shapes of three sample images are transformed into an average face shape, and the luminance thereof under the average face shape.

Further, a principal component analysis is performed based on the luminance of each of the sample images after transformed into the average face shape (step #5). As a result, the luminance of any face image under the average face shape may be approximated by formula (6) below.

$$A = A_0 + \sum_{i=1}^{m} q_i \lambda_i \quad (6)$$

where: A is a luminance vector on which the luminance of each pixel under the average face shape is arranged ($a_1$, --- $a_m$; m is the total number of pixels on the average face shape); A0 is n average face luminance vector on which the average luminance value of each pixel of each sample image in the average face shape is arranged; $q_i$ is a unique vector representing the $i^{th}$ principal component of the face luminance obtained by the principal component analysis; and $\lambda_i$ is a weighting factor for each unique vector $q_i$. FIG. 10 schematically illustrates how the face luminance varies when the values of the weighting factors $\lambda_{i1}$ and $\lambda_{i2}$ for the unique vectors $q_{i1}$ and $q_{i2}$ representing the $i^{th}_1$ and $i^{th}_2$ principal components respectively obtained through the principal component analysis are varied. The variation width is from −3 sd to +3 sd, which is based on the standard deviation sd of the values of the weighting factors $\lambda_{i1}$, and $\lambda_{i2}$ when the pixel values of the face of each sample image are represented by the formula (6) above. The face shape in the center of the three face shapes in each principal component is the average face shape. This example shows that a component contributing to the existence or nonexistence of beard is derived as the $i^{th}_1$ principal component as a result of the principal component analysis, and the face varies from a face with dense beard (−3 sd) to a face without beard (+3 sd) by varying the weighting factor $\lambda_{i1}$. Similarly, a component contributing to shade on the face is derived as the $i^{th}_2$ principal component, and the luminance of the face varies from a face with shade on the right (−3 sd) to a face with shade on the left (+3 sd) by varying the weighting factor $\lambda_{i2}$. Note that the principal component having a smaller value of order "i" has stronger explanatory power of luminance. That is, it means a greater contribution to the face luminance.

The mathematical model M of face is generated through steps #1 to #5 described above. That is, the mathematical model M is represented by a plurality of unique vectors $p_i$ representing face shapes and unique vectors $q_i$ representing face luminance under the average face shape, which is dimension compressed in which the total number of each type of unique vectors is far smaller than the number of pixels forming the face image. Note that in the embodiment described in the reference document 2, a mathematical model of face image represented by 23 unique vectors for face shape, and 114 unique vectors for face luminance is generated by setting 122 characteristic points for an image formed of 10,000 pixels and performing the aforementioned process, and it is described that 90% of variations in the face shape and luminance may be represented by varying the weighting factor for each unique vector.

The face detection section 11 reads in an image P0 and detects a face portion P0f in the image P0. More specifically, as described in Japanese Unexamined Patent Publication No. 2005-108195 (reference document 3), a determination is made whether a face candidate region is present in the image P0 by inputting a first characteristic amount indicating the direction of a gradient vector representing the direction and magnitude of an edge at each pixel to a plurality of first discriminators (to be described later). If a face candidate region is present, the region is extracted, and the magnitude of the gradient vector at each pixel on the extracted region is normalized. Then, a determination is made whether the extracted face candidate region is a true face region by inputting a second characteristic amount indicating the magnitude and direction of the normalized gradient vector to a second discriminator (to be described later), and if it is determined to be a true face region, the region is extracted as the face portion P0f. Here, the first/second discriminators are generated through a learning process of a machine learning technique, such as AdaBoost or the like, which uses, as input, the first/second characteristic amounts calculated for a plurality of images known to be of faces and a plurality of images known to not be of faces, which are sample images for learning.

Various known techniques may be used for detecting the face portion P0f, which may include: a method that uses a correlation score between a unique face expression and the image itself as described in PCT Japanese Publication No. 2004-527863 (reference document 4), knowledge base, characteristics extraction, flesh color detection, template matching, graph matching, statistical methods (neural network, SVM, HMM), and the like. Note that the face portion P0f may be manually specified through a mouse or keyboard operation in the standard retouching screen 200, or automatic detection results may be manually corrected.

The parameter obtaining section 14 applies the face portion P0f to the mathematical model M. More specifically, it reconstructs the image based on formulae (1) and (6) described above by varying the values of the weighting factors $b_i$ and $\lambda_i$ for the unique vectors $p_i$ and $q_i$ from the top principal components in formulae (1) and (6), and obtains the weighting factors $b_i$ and $\lambda_i$ (collectively referred to as parameter C0) when the difference between the reconstructed image and the face portion P0f is minimal (refer to the reference document 4 for detail). Note that it is preferable that the range of the values of the weighting factors $b_i$ and $\lambda_i$ be based on the standard deviations sd of the distributions of $b_i$ and $\lambda_i$ when the sample images are represented by the formulae (1) and (6) at the time of generating the model, and limited to, for example, from −3 sd to +3 sd, and if the values do not fall in the range, the average values of the distributions be used. This may prevent an erroneous application of the model.

The reference table T is a table in which correlation between the positions of the slide levers 221 to 224 disposed in the retouching amount adjusting frame 203 of the standard retouching screen 200 and the parameters C0 is defined in advance. More specifically, for each of the slide levers, i.e., retouching contents, such as smile face, crying face, angry face, contour, and the like, the correlation between the position of the lever and the values of the weighting factors ($b_i$ and $\lambda_i$) having influence on the retouching content has been experimentally or statistically obtained in advance. Here, a table that defines correlation between the position of the slide lever 221 for adjusting the degree of smiling and weighting factors ($b_i$ and $\lambda_i$) is referred to as T1. A table that defines correlation between the position of the slide lever 222 for adjusting the degree of crying and weighting factors ($b_i$ and $\lambda_i$) is referred to as T2. A table that defines correlation between the position of the slide lever 223 for adjusting the degree of anger and weighting factors ($b_i$ and $\lambda_i$) is referred to as T3, and a table that defines correlation between the position of the slide lever 224 for adjusting face contour and weighting factors ($b_i$ and $\lambda_i$) is referred to as T4.

The parameter change accepting section 17 performs the following two processes. The first process is a process for determining initial positions of the slide levers 221 to 224. More specifically, it obtains the position of the slide lever 221 corresponding to the value of parameter C0 obtained by the parameter obtaining section 14 based on the reference table T1. Similarly, it obtains positions of the slide levers 222 to 224 corresponding to the respective values of parameter C0 based on the reference tables T2 to T4 respectively. Then, it updates the position of each of the slide levers 221 to 224 to the obtained position in the retouching amount adjusting frame 203 of the standard retouching screen 200. The second process is a process for obtaining the values of the parameter C1 corresponding to the positions of the slide levers 221 to 223 according to the positional movement thereof through a user operation. For example, if a moving event occurs on the slide lever 221 through a mouse drag operation by the user, it obtains the value of the parameter C1 corresponding to the position of the slide lever 221 after moved based on the reference table T1. Further, it obtains the positions of the slide levers 222 to 224 corresponding to the parameter C1, and updates the positions of the slide levers 221 to 224 to the obtained positions in the retouching amount adjusting frame 203 of the standard retouching screen 200. Similar process is performed when other slide levers 222 to 224 are moved by the user except that a different reference table is used.

The image reconstruction section 18 reconstructs the image P1f by substituting the value of the parameter C1 corresponding to the position of the slide lever after moved. Further, it generates the image P1 by replacing the face portion P0f in the image P0 with the reconstructed image P1f and combining them together, and updates the image area 211 of the standard retouching screen 200 from the image P0 to image P1.

User operation and process flow for performing standard image retouching will now be described.

When the program of the photo image viewer is activated by the user, the image list screen 100 (FIG. 2) is displayed. When an image P0 for retouching is selected by the user from thumbnail images displayed in the thumbnail frame 103 (here, 131a) by clicking on the image, the frame of the image area where the image P0 is displayed is bolded, and the file name of the image is stored in the image file memory. Then, the "Standard Image Retouching" button 119 of the menu frame 102 is clicked, the standard retouching screen 200 is loaded and displayed, and the image read out from the image file having the file name stored in the image file memory, i.e., the image P0 selected in the image list screen 100 is displayed in the image area 211 of the image frame 202.

Here, in parallel with the load and display of the standard retouching screen 200, the face detection section 11 detects a face portion P0f from the image P0, and the parameter obtaining section 14 obtains a weighting parameter C0 by applying the detected face portion P0f to the mathematical model M, and the parameter change accepting section 17 obtains the positions of the levers 221 to 224 corresponding to the obtained weighting parameter C0 based on the reference table T, and moves the position of each lever in the retouching amount adjusting frame 203 of the standard retouching screen 200 to the obtained position.

If the user moves the position of a desired slide lever (here, "Change Contour"), for example, to left (side to bring the contour closer to an inverted triangle) through mouse drag, the parameter change accepting section 17 obtains the weighting parameter C1 corresponding to the position of the lever after moved based on the reference table T, and the image reconstruction section 18 generates a face portion P1f, which is the original face portion P0f retouched in the contour to an inverse triangular shape, by reconstructing the face portion based on the obtained weighting parameter C1 and the mathematical model M. It further generates an image P1, which is the image P0 with the face portion P0f replaced by the face portion P1f, and updates the display in the image area 211.

The user confirms the image P1 in the updated image area 211, and may repeat the moving operation of the slide levers 221 to 224 to repeat retouching by the parameter change accepting section 17 as required, restore the original image P0 by clicking on the "Restore" button 231, or click on the "Close after Save" button 233 if desired results are obtained. This replaces the data in the file having the file name stored in the image file memory with the data representing the retouched image, and recorded on the hard disk. If desired results are not yet obtained, the user may click on "To Free Retouching" button 232 to perform free retouching to be described later, or discard the retouched contents by clicking on "Close without Save" button 234 and close the standard retouching operation without changing the data in the original image file.

In the description above, it is assumed that a single mathematical model M is used. But the model M many be provided for each slide lever, i.e., each retouching content. In this case, in parallel with the load and display of the standard retouching screen 200, the parameter obtaining section 14 obtains a weighting parameter by applying the face portion P0f detected by the face detection section 11 to the mathematical model M corresponding to the retouching content, the parameter change accepting section 17 changes the parameter corresponding to the retouching content of the lever moved by the user, and the image reconstruction section 18 reconstructs the face portion P1f based on the changed parameter and the model corresponding to the parameter. Preferably, sample images for generating models corresponding to respective retouching contents are those related to the retouching contents. For example, when generating a model corresponding to "Contour Change" slide lever 224, a plurality of sample images with face contours ranging from an inverted triangular shape to a square shape are used. Then, in principal component analysis, a principal component representing more accurate face contour may be extracted. Therefore, from the viewpoint of face contour, the application accuracy of the model in the parameter obtaining section 14 is improved, and the reference table T may define the correlation between the position of the slide lever 224 and the weighting parameter more accurately. Consequently, the face portion P1f after retouched in the face contour, which is reconstructed in the image reconstruction section 18, may become more accurate.

Figure 4:
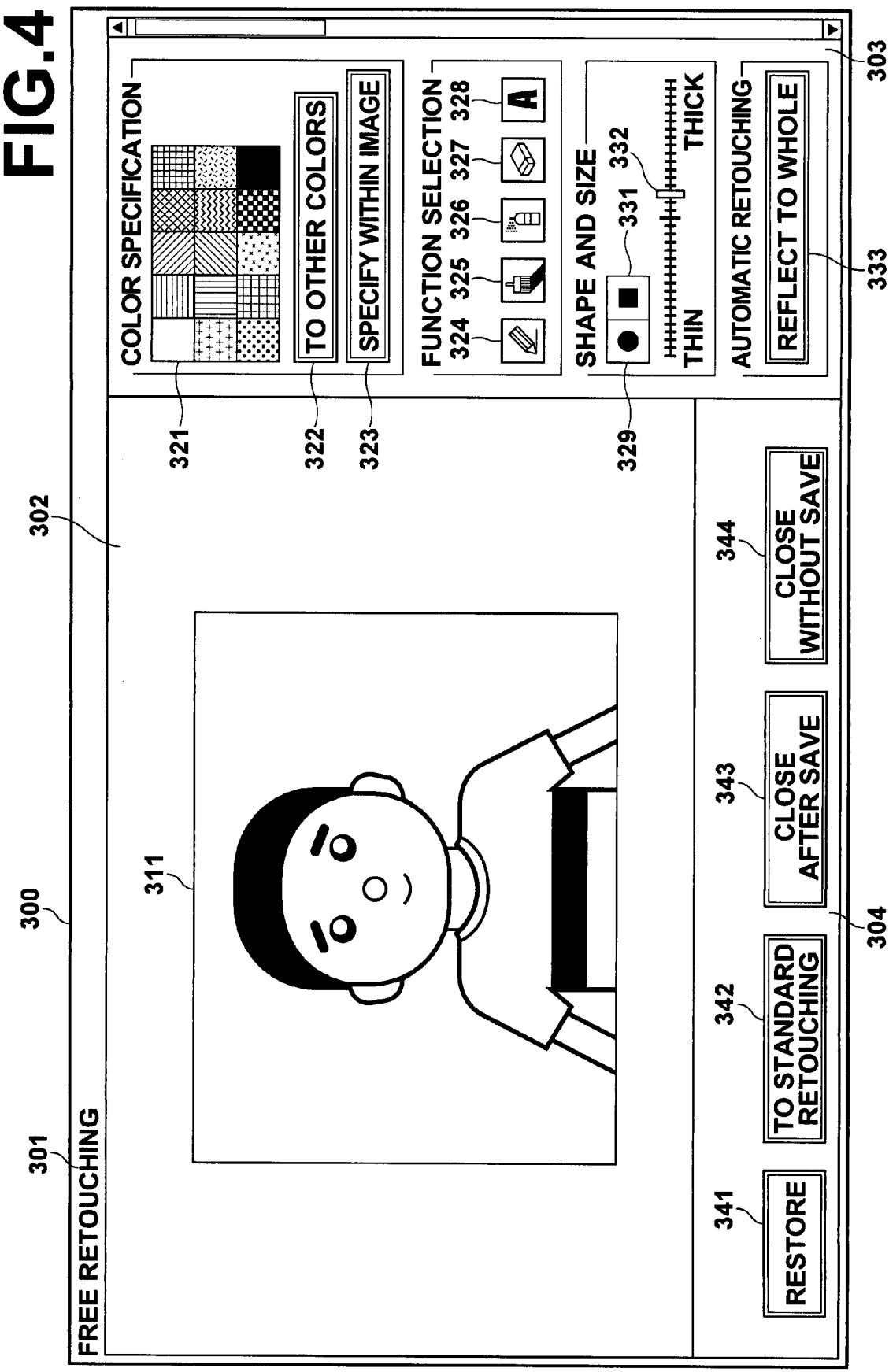
FIG. 4 illustrates an example free retouching screen of the photo image viewer.

FIG. 4 illustrates an example free retouching screen 300 which is loaded and displayed when a click event occurs on "Free Image Retouching" button 120. As illustrated, the free retouching screen 300 includes a title bar 301, an image frame 302, a retouching operation setting frame 303, and a control frame 304. The image frame 302 includes an image area 311 for displaying a retouching target image. The retouching operation setting frame 303 includes command buttons and slide levers (321 to 333) for setting details of retouching operations, and control frame 304 includes command buttons 341 to 344 for controlling retouching operations and the like. In the free retouching screen 300, the user may perform non-standard image retouching in the image area 311 of the image frame 302 using the mouse pointer as a brush, as in known retouching software, based on the setting in the retouching operation setting frame 303.

The image displayed in the image area 311 of the image frame 302 is the image displayed in the selected image area (e.g., 131a) of the thumbnail frame 103 of the image list screen 100. The file name of the image is obtained from the image file memory, then the file having the file name is read in and the image is displayed based on the image data included in the file.

The retouching operation setting frame 303 includes user interfaces (321 to 332) for specifying a color, selecting a retouching function, and specifying the shape and size of the pointer for performing retouching operations. Further, it includes a command button 333 for performing an automatic retouching function according to an embodiment of the present invention, which reflects contents of partial retouching in the entire image (to be described in detail later). The color pallet 321 is a collection of buttons for specifying a color used for coloring the image area 311 in a retouching operation, and each button is associated with color information (RGB values) If the user clicks on the button of a desired color, the color information associated with the button is read out, and stored in a predetermined region (color memory) of the main memory of the PC. When a click event occurs on "To Other Colors" button 322, an object of color specifying screen for directly inputting RGB values is loaded and displayed. If a click event occurs on "Specify within Image" button 323, and thereafter a click event occurs on the position desired by the user in the image area 311, the color information of the clicked position is obtained and stored in the color memory. "Pencil" button 324, "Brush" button 325, "Spray" button 326, "Eraser" button 327, and "Text" button 328 within the function selection menu are the buttons for selecting the function of the mouse pointer when performing a retouching operation in the image area 311. If a click event occurs on any one of the buttons described above, information of the function corresponding to the clicked button is stored in a predetermined region (retouching function memory) of the main memory of the PC. "Circle" button 329 and "Rectangle"

button 331 are buttons for selecting the shape of the writing tip when performing a retouching operation. If a click event occurs on either one of the buttons, information of the "writing tip" is stored in a predetermined region (writing tip shape memory) of the main memory of the PC. A slide lever 332 is a lever for specifying the size of the writing tip. Correlation between the position of the lever and the size of the writing tip is predefined, and information of the size of the writing tip is obtained based on the correlation and the actual position of the lever, which is stored in a predetermined region (writing tip size memory) of the main memory of the PC. If a click event occurs on "Reflect to Whole" button 333, an automatic retouching process of the present invention, described later, is performed, and the contents of manual retouching performed so far on a portion of the image displayed in the image area 311 are reflected to the entire portion of the image.

In the control frame 304, if a click event occurs on "Restore" button 341, the image displayed in the image area 311 is restored to the original pre-retouching state in the same manner as the "Restore" button 231 in the standard retouching screen 200. If a click event occurs on "To Standard Retouching" button 342, the standard retouching screen 200 (FIG. 3) for performing the aforementioned standard retouching operations on the image currently displayed in the image area 311 is loaded and displayed. Further, if a click event occurs on "Close after Save" button 343, the file contents of the retouching target image are replaced by the image data representing the image currently displayed in the image area 311, and the free retouching screen 300 is closed. If a click event occurs on "Close without Save" button 344, the image currently displayed in the image area 311 is discarded without changing the file contents of the retouching target image, and the free retouching screen 300 is closed.

Figure 11:
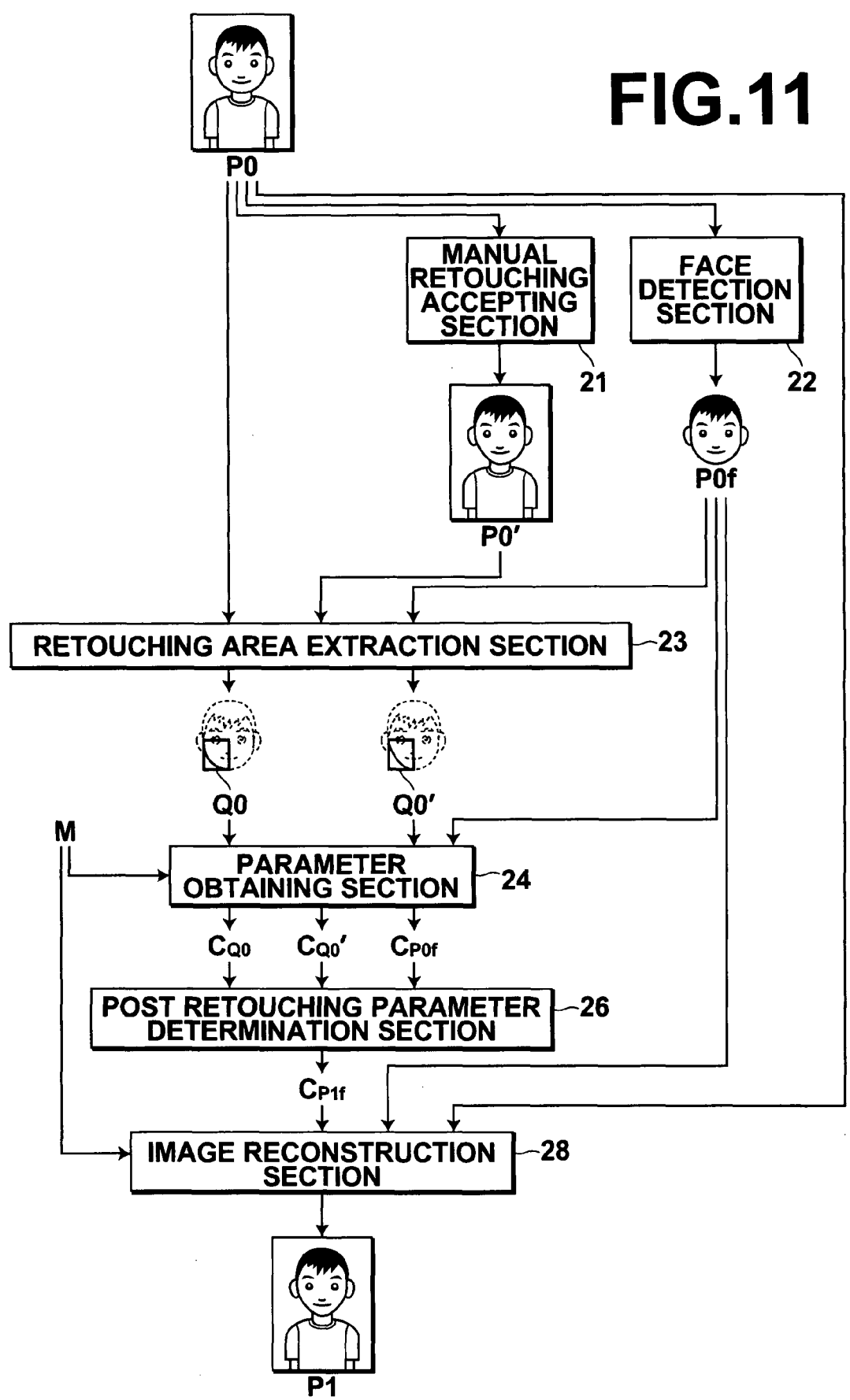
FIG. 11 is a block diagram schematically illustrating the configuration and data flow of an automatic image retouching process using the mathematical model according to a first embodiment of the present invention.

FIG. 11 is a block diagram illustrating the configuration and data flow of the automatic image retouching process, i.e., reflecting the contents of free retouching performed on a portion of an image to the entire portion of the image, according to a first embodiment of the present invention, which is performed in the free retouching screen 300 based on user operations. As illustrated, the automatic retouching process according to the first embodiment of the present invention is realized by: a manual retouching accepting section 21 for accepting manual retouching on an image P0 displayed in the image area 311; a face detection section 22 for detecting a face portion P0f in the image P0; a retouching area extraction section 23 for extracting an image Q0 representing the original pre-retouching state of a manually retouched portion in the face portion and the adjacent area thereof, and an image Q0' representing the post-retouching sate thereof based on the difference between the pre-manual-retouching image P0 and a post-manual-retouching image P0', and position information of the face portion P0f in the image P0; a parameter obtaining section 24 for obtaining weighting parameters $C_{Q0}$, $C_{Q0'}$, and $C_{P0f}$ by applying the extracted images Q0, Q0', and the face portion P0f to a mathematical model M generated by AAM (reference document 2) based on a plurality of sample images representing human face portions, the weighting parameters $C_{Q0}$, $C_{Q0'}$, and $C_{P0f}$ being used for weighting principal components of the mathematical model M corresponding to unique characteristics of the respective areas; a post retouching parameter determination section 26 for determining a parameter $C_{P1f}$ representing a post-retouching face portion P1f when the contents of the manual retouching are reflected to the entire portion thereof based on the obtained weighting parameters $C_{Q0}$, $C_{Q0'}$, and $C_{P0f}$; and a image reconstruction section 28 for generating an image P1f of reconstructed face portion based on the post retouching parameter $C_{P1f}$ and mathematical model M, and generating an image P1, which is the image P0 with the face portion P0f replaced by the reconstructed face portion P1f.

Here, the face detection section 22, mathematical model M, and image reconstruction section 28 are identical to the face detection section 11, mathematical model M, and image reconstruction section 18 respectively in the standard retouching process illustrated in FIG. 5.

In response to the occurrence of a mouse drag event within the image area 311 in the free retouching screen 300, the manual retouching accepting section 21 obtains the position on which the drag operation was performed within the image area 311, determines a retouching target area within the image P0 displayed in the image area 311 based on the obtained position and the contents stored in the writing tip shape memory and writing tip size memory, changes pixel values within the retouching target area according to the contents stored in the retouching function memory, and updates the display to the post-manual-retouching image P0'. More specifically, if the content of the retouching function memory is Pencil (324) or Brush (325), a process for painting the retouching target area with a color, selected from the color pallet 321 or from a screen displayed by clicking on "To Other Colors" button 322, or specified within the image area 311 after clicking on "Specify within Image" button 323 by the user, is performed by changing pixel values within the retouching target area to pixel values based on the color information stored in the color memory. If the content of the retouching function memory is Spray (326), a process for coloring the retouching target area, as if a color selected from the color pallet 321 is sprayed by the user, is performed by changing pixel values of a portion of the retouching target area to pixel values based on the color information stored in the color memory. If the content of the retouching function memory is Eraser (327), a process for restoring pixel values within the retouching target area to the original values before retouching. If the content of the retouching function memory is Text (328), a process in response to a drag event within the image area 311 is not performed, but a process for displaying a text box, which allows entry of text, at a clicked position, and accepting entry of text through a keyboard is performed. The manual retouching process may be repeated a plurality of times. Further, the repetition of retouching process may be performed while changing the setting of the retouching.

The retouching area extraction section 23 first identifies a retouched area in the image by obtaining the difference between the pre-manual-retouching image P0 and post-manual-retouching image P0', and then identifies the area in the face portion P0f and the adjacent area thereof where the manual retouching has been performed based on the position information of the face portion P0f in the image P0. Then, it cuts out the identified area from the original image P0, which is designated as image Q0 representing the original pre-retouching state of a manually retouched portion in the face portion P0f and adjacent area thereof, and cuts out the identified area from the post-manual-retouching P0', which is designated as image Q0' representing the post-retouching state of the manually retouched portion in the face portion P0f and adjacent area thereof. Note that the area including the face portion P0f and adjacent area thereof may be extracted from the pre-manual-retouching image P0 and post-manual-retouching image P0' first, then the manually retouched portion in the face portion P0f and adjacent area thereof may be identified by obtaining the difference between the extracted areas, and the images Q0 and Q0' may be obtained by cutting out the identified area from the images P0 and P0'.

The parameter obtaining section 24 applies the images Q0, Q0' and the face portion P0f to the mathematical model M in the same manner as the parameter obtaining section 14 in the standard retouching process illustrated in FIG. 5, and obtains weighting parameters $C_{Q0}$, $C_{Q0'}$ and $C_{P0f}$, each corresponding to each of them. Here, each of the images Q0 and Q0' represents a portion of the face portion P0f, so that it is applied to the mathematical model M with the pixel values in the area corresponding to the remaining portion of the face set to zero.

The post retouching parameter determination section 26 determines the parameter $C_{P1f}$ corresponding to the state in which the contents of the manual retouching performed on a portion of the face portion P0f have been reflected to the entire face portion P0f based on the variance between the parameter $C_{Q0}$ corresponding to the original pre-retouching state of a manually retouched portion in the region including the face portion P0f and adjacent area thereof and the parameter $C_{Q0'}$ corresponding to the post-retouching state thereof, and the parameter $C_{P0f}$ corresponding to the original pre-retouching state of the entire face portion P0f. The parameter $C_{P0f}$ may be obtained, for example, by formula (7) below.

$$C_{P1f} = C_{P0f} + k(C_{Q0'} - C_{Q0}) \quad (7)$$

where, k is a coefficient experimentally or statistically obtained in advance. Here, each of the $C_{Q0}$, $C_{Q0'}$, $C_{P0f}$ and $C_{P1f}$ is treated as a vector quantity constituted by weighting parameters $b_i$ and $\lambda_i$ (i=1, 2, - - -) for each principal component of the mathematical model M. In the vector representing the variance in the parameter arising from the manual retouching ($C_{Q0'} - C_{Q0}$), the value of the component corresponding to the weighting factor not influenced by the manual retouching becomes zero. Thus, the weighting is performed only for the weighting factors influenced by the manual retouching according to the variance thereof. The values of only the weighting factors, which are the components of the vector $C_{P0f}$ representing the original face portion P0f, influenced by the manual retouching are adjusted according to the variance thereof by the manual retouching.

User operation and process flow for performing the automatic retouching process of the present invention, i.e., reflecting the contents of manual retouching performed on a portion of an image to the entire image, in the free retouching screen 300 will now be described.

When the program of the photo image viewer is activated by the user, the image list screen 100 (FIG. 2) is displayed. When a retouching target image P0 is selected by the user from thumbnail images displayed in the thumbnail frame 103 (here, 131a) by clicking on the image, the frame of the image area where the image P0 is displayed is bolded, and the file name of the image is stored in the image file memory. Then, the "Free Image Retouching" button 120 in the menu frame 102 is clicked, the free retouching screen 300 is loaded and displayed, and the image read out from the image file having the file name stored in the image file memory, i.e., the image P0 selected in the image list screen 100 is displayed in the image area 311 of the image frame 302.

The user selects a brush or the like to be used in the manual retouching by clicking on any one of the buttons within the "Function Selection" region of the retouching operation setting frame 303. In addition, the user specifies a color to be used in the manual retouching in the "Color Specification" region as required, and further specifies the shape and size of the selected brush or the like in the "Shape and Size" region. The user performs a mouse drag operation on a portion within the image area 311 of the image frame 302 where the user wants to perform retouching. Then, the mouse drag operation is accepted by the manual retouching accepting section 21, thereby pixel values of the retouching area are changed according to the selected brush and color, and the image area 311 is updated to the post-retouching image P0'.

The user confirm the image P0' in the updated image area 311, and may repeat the manual retouching operation as required, restore the pre-retouching image P0 by clicking on the "Restore" button 341, or click on the "Close after Save" button 343 if desired results are obtained. This replaces the contents of the file having the file name stored in the image file memory with the contents representing the retouched image, and recorded on the hard disk.

In the manual retouching, there may be a case in which the user wants to make the face contour of a person in an image thinner, but feels tiresome to manually retouch both the right and left contours, and demands that if the right side contour is manually retouched, the left side contour is automatically retouched in the same way. In such a case, the user may click on "Reflect to Whole" button 333 to perform the automatic retouching process of the present invention.

In response to the occurrence of the click event on the "Reflect to Whole" button 333, the face detection section 22 detects a face portion P0f in an image P0, the retouching area extraction section 23 identifies a manually retouched portion (right side contour and adjacent area thereof in the example case described above) by obtaining the difference between the pre-manual-retouching image P0 and post-manual-retouching image P0', and further, based on this and the position information of the face portion P0f in the image P0, extracts an image Q0 representing original pre-retouching state of a manually retouched portion in the face portion P0f and adjacent area thereof and an image Q0' representing the post-retouching state thereof. The parameter obtaining section 24 applies the images Q0, Q0' and the face portion P0f to the mathematical model M to obtain weighting parameters $C_{Q0}$, $C_{Q0'}$ and $C_{P0f}$. The post retouching parameter determination section 26 determines a parameter $C_{P1f}$ representing a face portion P1f, which is the face portion P0f when the contents of the manual retouching is reflected to the entire portion thereof based on the obtained parameters $C_{Q0}$, $C_{Q0'}$ and $C_{P0f}$. The image reconstruction section 28 generates an image P1f of reconstructed face portion based on the post retouching parameter $C_{P1f}$ and mathematical model M, generates an image P1, which is the image P0 with the face portion P0f replaced by the reconstructed face portion P1f, and updates the display in the image area 311.

The user confirms the image P1 in the updated image area 311, and may repeat the manual retouching and automatic retouching process of the present invention as required, restore the pre-retouching image P0 by clicking on the "Restore" button 341, or click on the "Close after Save" button 343 if desired results are obtained. This replaces the data in the file having the file name stored in the image file memory with the data representing the retouched image, and recorded on the hard disk. If desired results are not yet obtained, the user may click on "To Standard Retouching" button 342 to perform the standard retouching (FIG. 3), or discard the retouched contents by clicking on "Close without Save" button 344 and close the free retouching operation without changing the data in the original image file.

As described above, according to the free image retouching process according to the first embodiment of the present invention, the face detection section 22 detects a face portion P0f from an image P0. The retouching area extraction section 23 identifies a manually retouched portion by obtaining the difference between an image P0', which is the image P0 after partial retouching accepted by the manual retouching accepting section 21 is performed, and the pre-manual-retouching image P0, and further, based on this and the position information of the face portion P0f in the image P0, extracts an image Q0 representing original pre-retouching state of a manually retouched portion in the face portion P0f and adjacent area thereof and an image Q0' representing the post-retouching state thereof. The parameter obtaining section 24 applies the images Q0, Q0' and the face portion P0f to the mathematical model M to obtain weighting parameters $C_{Q0}$, $C_{Q0'}$ and $C_{P0f}$. The post retouching parameter determination section 26 determines a parameter $C_{P1f}$ representing a face portion P1f, which is the face portion P0f when the contents of the manual retouching is reflected to the entire portion thereof based on the obtained parameters $C_{Q0}$, $C_{Q0'}$ and $C_{P0f}$. The image reconstruction section 28 generates an image P1f of reconstructed face portion based on the post retouching parameter $C_{P1f}$ and mathematical model M, generates an image P1, which is the image P0 with the face portion P0f replaced by the reconstructed face portion P1f. Thus, in a case where user wants to retouch a portion of the face portion P0f in the image P0, and then to retouch the other portion according to the partial retouching, the user does not need to manually retouch the other portion, so that the retouching time may be reduced, and high skills for the retouching are not required. The retouching performed on a portion of a face is reflected to the entire portion of the face using the weighting parameters in the mathematical model M representing a face, so that the entire portion of the face may be retouched in natural finish without departing from the scope of naturalness of the face represented by the mathematical model M.

In the first embodiment described above, any portion of a face is reflected to the entire portion of the face. Where a retouching target is predetermined, for example, in the case that nonstandard retouching performed on a right eye is reflected to the left eye, or the like, a second embodiment described below may be employed.

Figure 12:
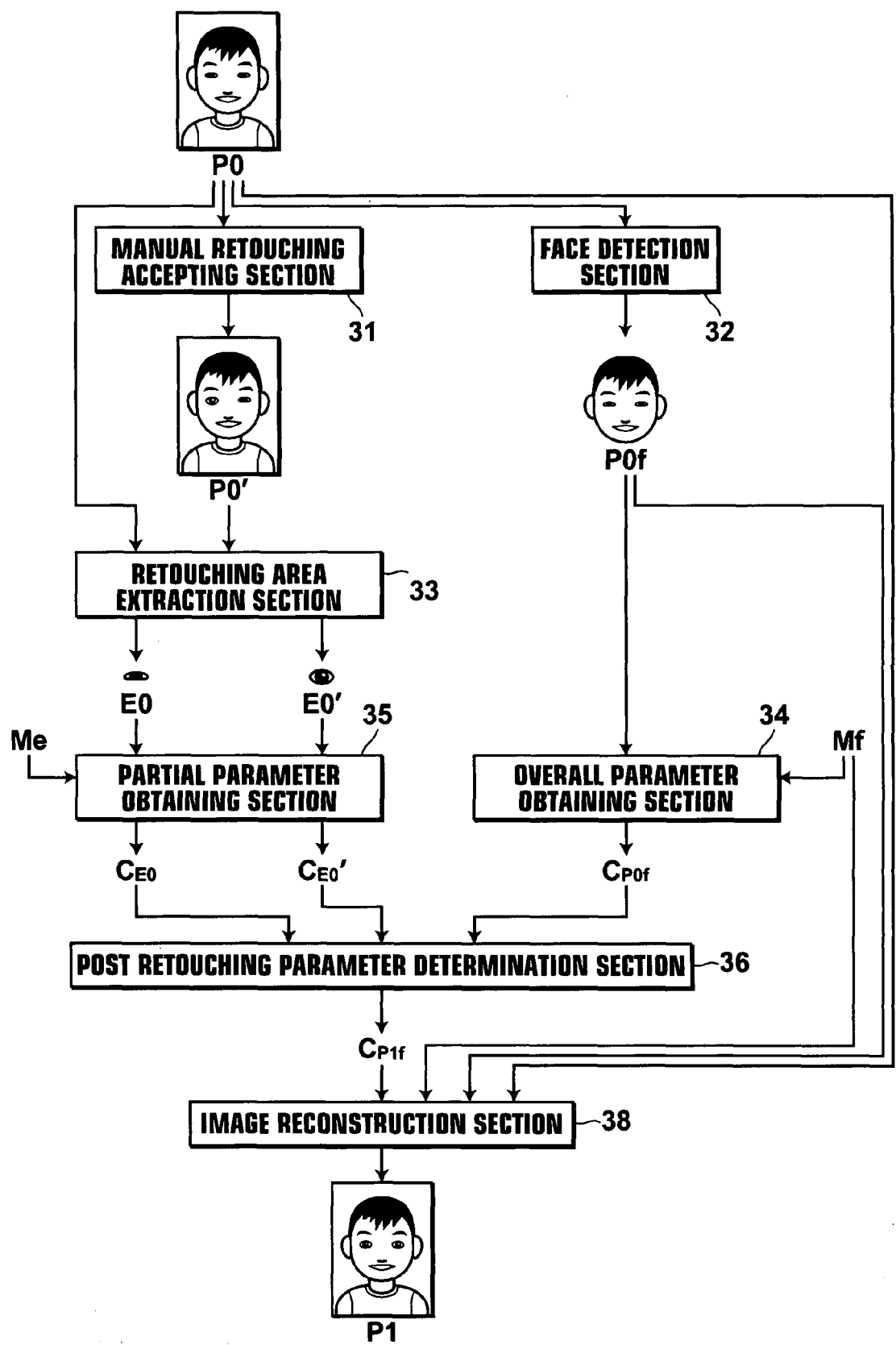
FIG. 12 is a block diagram schematically illustrating the configuration and data flow of an automatic image retouching process using the mathematical model according to a second embodiment of the present invention.

FIG. 12 is a block diagram illustrating the configuration and data flow of the automatic image retouching process according to a second embodiment of the present invention, which is performed in the free retouching screen 300 based on user operations, by way of example in which nonstandard retouching performed on a right eye is reflected to the left eye. As illustrated, the automatic retouching process according to the second embodiment of the present invention is realized by: a manual retouching accepting section 31 for accepting manual retouching on the right eye in an image P0 displayed in the image area 311; a face detection section 32 for detecting a face portion P0f in the image P0; a retouching area extraction section 33 for extracting an image E0 representing the original pre-retouching state of a manually retouched portion in the right eye, and an image E0' representing the post-retouching sate thereof based on the difference between the pre-manual-retouching image P0 and the post manual retouching image P0'; an overall parameter obtaining section 34 for obtaining an overall parameter $C_{P0f}$ by applying the face portion P0f to a mathematical model Mf of a human face generated by AAM (reference document 2), the overall parameter $C_{P0f}$ being used for weighting principal components of the mathematical model Mf corresponding to the unique characteristics of the face portion P0f; a partial parameter obtaining section 35 for obtaining partial parameters $C_{E0}$, $C_{E0'}$ by applying the image E0 representing the original pre-retouching state of the right eye and image E0' representing the post-retouching sate thereof to a mathematical mode Me of a human right eye generated by AAM (reference document 2), the partial parameters $C_{E0}$, and $C_{E0'}$ being used for weighting principal components of the mathematical model Me corresponding to the unique characteristics of the right eye before and after retouching; a post retouching parameter determination section 36 for determining a parameter $C_{P1f}$ representing a post-retouching face portion P1f when the contents of the manual retouching performed on the right eye are reflected to the left eye based on the obtained weighting parameters $C_{P0f}$, $C_{E0}$, and $C_{E0'}$; and an image reconstruction section 38 for generating an image P1f of reconstructed face portion based on the post-retouching parameter $C_{P1f}$ and mathematical model M, and generating an image P1, which is the image P0 with the face portion P0f replaced by the reconstructed face portion P1f.

Here, the manual retouching accepting section 31, face detection section 32, mathematical model Mf of a face portion, overall parameter obtaining section 34, and image reconstruction section 38 are identical to the manual retouching accepting section 21, face detection section 22, mathematical model M, overall parameter obtaining section 24, and image reconstruction section 28 respectively in the first embodiment illustrated in FIG. 11.

The retouching area extraction section 33 identifies a retouched portion within the right eye by obtaining the difference between the pre-manual-retouching image P0 and post-manual-retouching image P0', and cuts out the area of the right eye from the images P0 and P0', which are designated as images E0 and E0' respectively. Note that the area of the right eye in an image displayed in the image area 311 may be specified by the user through a mouse drag operation, and the specified area may be cut out from the pre-manual-retouching image P0 and post-manual-retouching image P0'.

The mathematical model Me is generated by AAM (reference document 2) based on a plurality of sample images representing a human right eye in the same manner as the mathematical model M described above. In the present embodiment, the mathematical model is provided for each of a plurality of portions within a face, and an appropriate mathematical model may be selected in the automatic retouching detail setting screen, which is loaded and displayed in response to a click event occurred on "Reflect to Whole" button 333 within the retouching operation setting frame 303. Specific examples of a plurality of portions within a face for which mathematical models are provided include right eye/left eye, right eyebrow/left eyebrow, right side/left side of the nose, right side/left side of the mouth, right side/left side of the face contour, right cheek/left cheek, and the like.

The partial parameter obtaining section 35 obtains the weighting parameters $C_{E0}$, and $C_{E0'}$ for principal components constituting the mathematical model Me by applying the images E0 and E0' representing the right eye before and after retouching to the mathematical model Me in the same manner as the parameter obtaining section 14 described above.

The post retouching parameter determination section 36 determines the overall parameter $C_{P1f}$ representing an image P1 in which the retouching on the right eye is reflected also to the left eye, by obtaining the variance between the parameters $C_{E0}$ and $C_{E0'}$ arising from retouching, and adjusting the value of a component (weighting factor) corresponding to the partial parameter within an overall parameter $C_{P0f}$, experimentally/statistically obtained in advance, based on the correlation between the overall and partial parameters. For example, if a weighting parameter $\lambda_K$ (hereinafter expressed as $C_{P0f}[\lambda_K]$, same applies to the partial parameter), which is a component of the overall parameter $C_{P0f}$, corresponds to a weighting factor $\lambda_L$, which is a component of the partial parameter, the post-retouching weighting factor $C_{P1f}[\lambda_K]$ may be obtained by formula (8) below, in which "m" is a coefficient experimentally/statistically obtained in advance.

$$C_{P1f}[\lambda_K] = C_{P0f}[\lambda_K] + m(C_{E0'}[\lambda_L] - C_{E0}[\lambda_L]) \quad (8)$$

Note that the correlation between the overall parameter and partial parameter is not limited to one-to-one relationship, and a combination of a plurality of weighting factors of the partial parameter may correspond to a single weighting factor of the overall parameter, a combination of a plurality of weighting factors of the overall parameter may correspond to a single weighting factor of the partial parameter, or a combination of a plurality of weight factors of the overall parameter may correspond to a combination of a plurality of weighting factors of the partial parameter.

User operation and process flow for performing the automatic retouching process according to the second embodiment of the present invention will now be described.

When the program of the photo image viewer is activated by the user, and a retouching target image P0 displayed in the thumbnail frame 103 of the displayed image list display screen 100 (FIG. 2) is selected by the user by clicking on the image, and further "Free Image Retouching" button 120 in the menu frame 102 is clicked, the free retouching screen 300 is loaded and displayed, and the image P0 selected in the image list screen 100 is displayed in the image area 311 of the image frame 302, as in the first embodiment.

The user selects a retouching function, color, and the like in the retouching operation setting frame 303, and performs a mouse drag operation on the area of the right eye within in the image area 311 of the image frame 302. Then, as in the first embodiment, the mouse drag operation is accepted by the manual retouching accepting section 31, thereby pixel values in the area of the right eye are changed according to the selected function, color, and the like, and the image area 311 is updated to the post-retouching image P0'.

After the retouching of the right eye is completed, if the "Reflect to Whole" button 333 is clicked by the user, the automatic retouching detail setting screen for selecting a reflecting source area, i.e., manually retouched portion is loaded and displayed. If the "Right Eye" is selected as the reflecting source by the user in the automatic retouching detail setting screen, a partial model used by the partial parameter obtaining section 35 is determined, and an automatic retouching process according to the second embodiment of the present invention is initiated.

The face detection section 32 detects a face portion P0f in the image P0 according to the selection/determination of the partial model. The retouching area extraction section 33 identifies a manually retouched portion within the right eye by obtaining the difference between the pre-manual-retouching image P0 and post-manual-retouching image P0' and extracts the images Q0 and Q0' representing the area of the right eye before and after the manual retouching respectively. The overall parameter obtaining section 34 obtains the weighting parameter $C_{P0f}$ by applying the face portion P0f to the mathematical model Mf representing a face portion. The partial parameter obtaining section 35 obtains the partial parameters $C_{E0}$, $C_{E0'}$ by applying the extracted images E0 and E0' to a mathematical model Me representing right eye selected/determined in the automatic retouching detail setting screen. The post retouching parameter determination section 36 determines the parameter $C_{P1f}$ representing a post-retouching face portion P1f when the contents of the manual retouching performed on the right eye are reflected to the left eye based on the obtained weighting parameters $C_{E0}$, $C_{E0'}$ and $C_{P0f}$. The image reconstruction section 38 generates the image P1f of reconstructed face portion based on the post-retouching parameter $C_{P1f}$ and mathematical model M, and generating the image P1, which is the image P0 with the face portion P0f replaced by the reconstructed face portion P1f, and updates the display in the image area 311.

The user confirms the image P1 in the updated image area 311 and may repeat the manual retouching and automatic retouching process of the present invention as required, restore the pre-retouching image P0 by clicking on the "Restore" button 341, or click on the "Close after Save" button 343 if desired results are obtained. This replaces the data in the file having the file name stored in the image file memory with the data representing the retouched image, and recorded on the hard disk. If desired results are not yet obtained, the user may click on "To Standard Retouching" button 342 to perform the standard retouching (FIG. 3), or discard the retouched contents by clicking on "Close without Save" button 344 and close the free retouching operation without changing the data in the original image file.

As described above, according to the free image retouching process according to the second embodiment of the present invention, the face detection section 32 detects a face portion P0f from an image P0. The retouching area extraction section 33 identifies a retouched portion within the right eye by obtaining the difference between the image P0', which is the image P0 after partial retouching accepted by the manual retouching accepting section 31 is performed and the pre-manual-retouching image P0, and extracts the images E0 and E0' representing the right eye before and after the retouching. The overall parameter obtaining section 34 obtains the weighting parameter $C_{P0f}$ by applying the face portion P0f to the mathematical model Mf of a human face. The partial parameter obtaining section obtains the partial parameters $C_{E0}$, $C_{E0'}$ by applying the images E0 and E0' to the mathematical model Me of a human right eye. The post retouching parameter determination section 36 determines the post-retouching face portion P1f when the contents of the manual retouching performed on the right eye are reflected to the left eye based on the obtained weighting parameters $C_{E0}$, $C_{E0'}$ and $C_{P0f}$. The image reconstruction section 38 generates the image P1f of reconstructed face portion based on the post-retouching parameter $C_{P1f}$ and mathematical model M, and generates the image P1, which is the image P0 with the face portion P0f replaced by the reconstructed face portion P1f. Thus, manual retouching is required only for a single eye, not for both, so that the retouching time may be reduced and high skills for the retouching are not required as in the first embodiment.

Figure 13:
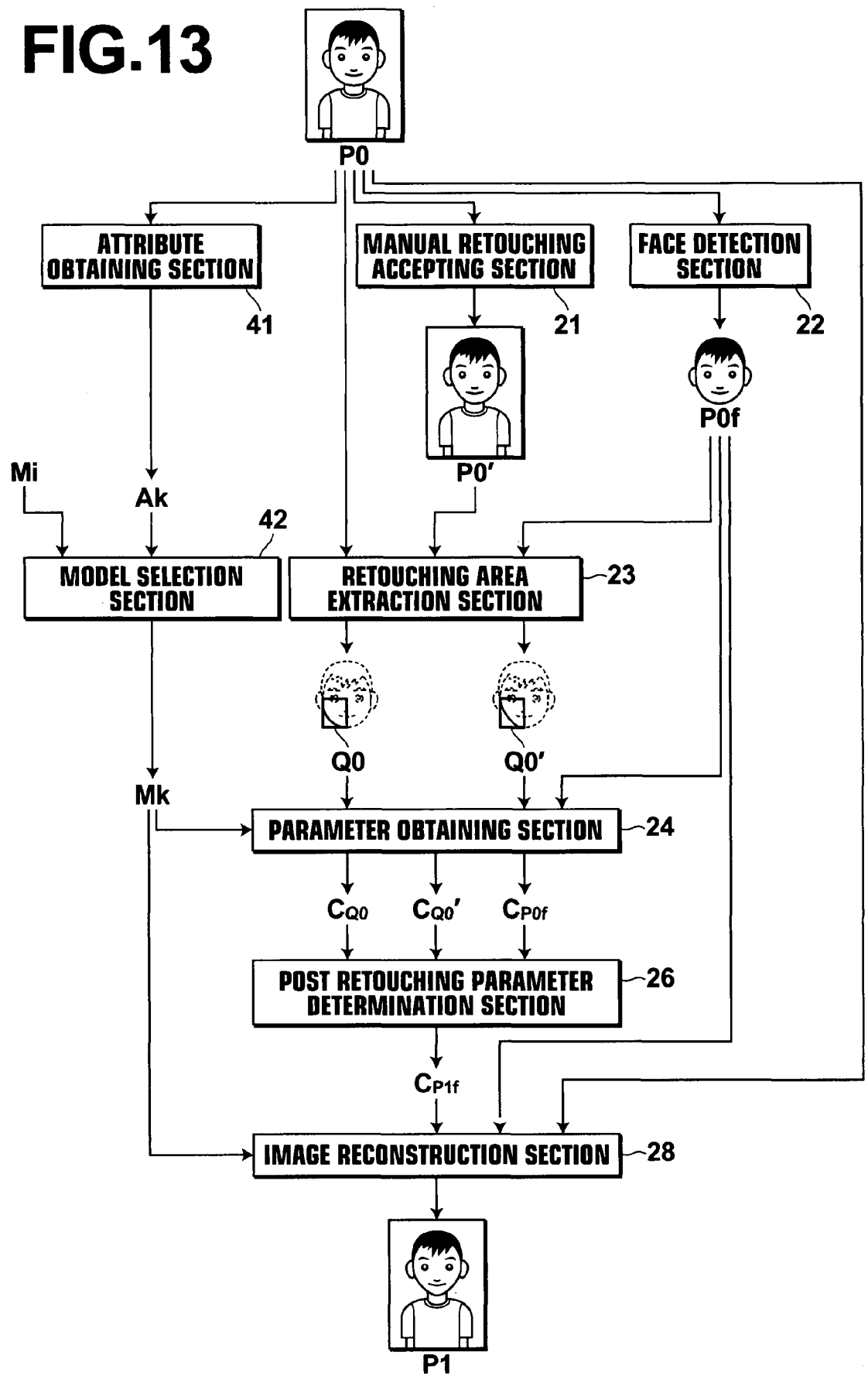
FIG. 13 is a block diagram schematically illustrating the configuration and data flow of a modified example of the automatic image retouching process according to the first embodiment of the present invention.

In the embodiments of the present invention described above, only a single mathematical model is provided for an entire face or a portion of the face, but a plurality of mathematical models may be generated, each for each attribute, such as human race, age, and gender. FIG. 13 a block diagram illustrating the configuration and data flow of the automatic image retouching process when the mathematical model M in the first embodiment is provided for each of a plurality of attributes. As illustrated, the present embodiment differs from the first embodiment in that it further includes: an attribute obtaining section 41 for obtaining attribute information $A_K$ of a subject in the image P0; and a model selection section 42 for selecting, based on the obtained attribute information $A_K$, a mathematical model $M_K$ generated from sample images representing only the subjects having the attribute.

Here, each of the plurality of mathematical models $M_i$ is generated, for example, from a sample image group representing subjects of the same race, age, gender, or the like based on the aforementioned method (FIG. 6), and stored with attribute information $A_i$ indicating the common attribute of the sample image group associated therewith.

The attribute obtaining section 41 may determine the attribute of the subject by performing a known recognition process (e.g., process described in Japanese Unexamined Patent Publication No. 11 (1999)-175724) on the image P0, and obtain the attribute information $A_K$, or the attribute of the subject may be recorded in the header or the like as auxiliary information when imaging the subject, and the recorded information is obtained at a later time. Still further, the attribute of the subject may be presumed base on the auxiliary information. For example, if GPS information of the location of imaging is available, the country or region corresponding to the GPS information may be identified. Noting that the race of the subject may be presumed from the GPS information to a certain degree, an arrangement may be adopted in which a reference table for associating GPS information with race information is provided in advance. Then, GPS information recorded in the header region of image data P0, obtained by a digital camera (described, for example, in Japanese Unexamined Patent Publication No. 2004-153428) that obtains GPS information and records the information in the header region of the image P0 at the time of imaging, is obtained with the image data P0 as input, and refers to the reference table based on the obtained GPS information to presume the race information associated with the GPS information as the race of the subject.

The model selection section 42 selects a mathematical model $M_K$ associated with the attribute $A_K$ obtained by the attribute obtaining section 41. The parameter obtaining section 24 and image reconstruction section 28 perform the processes identical to those in the first embodiment using the selected mathematical model $M_K$.

In this way, if the arrangement is adopted in which mathematical models Mi for a plurality of attribute are provided in advance, and the model selection section 42 selects a mathematical model $M_K$ associated with the attribute $A_K$ obtained by the attribute obtaining section 41, and the selected mathematical model $M_K$ is used by the parameter obtaining section 24 and image reconstruction section 28, no unique vector for explaining the variation in the face shape or luminance arising from the difference in the attribute $A_K$ is present in the mathematical model $M_K$, so that the face portion may be represented only by the unique vectors representing other factors determining the face shape and luminance, thereby the processing accuracy may be improved, and a higher quality image may be obtained.

Preferably, the attribute-based mathematical models are further specialized, and individual-based mathematical models are generated from the viewpoint of the processing accuracy. In this case, it is necessary to associate images P0 with information for identifying individuals.

It is also preferable to provide race-based mathematical models in advance, and the mathematical model distributed with the photo image viewer software is changed according to the country or the region to which the software is shipped, the location of a server of the download source of the software, or the like, from the viewpoint of improving the processing accuracy. Alternatively, it is also desirable to make the mathematical models selectable at the time when installing the software from the viewpoint of improving the processing accuracy.

Further, the function to generate the mathematical model may be implemented in the photo image viewer software. More specifically, a program for performing the process explained based on the flowchart shown in FIG. 6 may be included in the photo image viewer software so that it is installed on the PC. It is also possible to provide a default mathematical model at the time of shipping the photo image viewer, and then to customize (modify) the mathematical model or generating a new model which is different from the default mathematical model. This is particularly effective when the individual-based mathematical models are generated.

In the foregoing embodiments, individual images are represented using separate weighting factors $b_i$ and $\lambda_i$ for shape and luminance respectively. There is a correlation between the shape and luminance variations, so that an appearance parameter "c", a new parameter, for controlling both the shape and luminance may be obtained by performing a principal component analysis on a vector $(b_1, b_2, ---, b_i, ---, \lambda_1, \lambda_2 ---, \lambda_i ---)$ obtained by combining the weighting factors $b_i$ and $\lambda_i$ as shown in formulae (9) and (10) below.

$$S = S_0 + Q_S \cdot c \qquad (9)$$

$$A = A_0 + Q_A \cdot c \qquad (10)$$

Here, the variance in the shape from the average face shape is represented by the appearance parameter "c" and the vector $Q_S$, and the variance element in the luminance from the average luminance is represented by the appearance parameter "c" and the vector $Q_A$.

When this model is used, the parameter obtaining sections 14, 24, overall parameter obtaining section 24, and partial parameter obtaining section 35 obtain luminance under the average shape based on formula (10) by varying the value of the appearance parameter "c", further reconstruct the image by transforming the average shape based on formula (9), and obtain the appearance parameter "c" when the difference between the reconstructed image and the input image (P0f, Q0, Q0', E0, E0') becomes minimal.

In the embodiments described above, the mathematical models based on the AAM scheme are employed. If the target of the automatic retouching described above is the shape of a face component, such as a face contour, eye, nose, or the like, a mathematical model based on the ASM scheme may be employed. In this case, it is necessary to obtain the weighting factor $b_i$ for the shape of formula (1) described above, but it is not necessary to obtain the weighting factor $\lambda_i$ for luminance. On the other hand, if the automatic retouching for the luminance of a face is performed, like the case where manual retouching for the flesh color performed on a portion of a face is reflected to the entire face, the AAM scheme is used.

In the aforementioned embodiments, the description has been made of a case where the present invention is implemented as the image retouching function of a photo image viewer operating on a PC. But the present invention may also be used for simulating cosmetic surgery or makeup.

What is claimed is:

1. An image processing apparatus, comprising:
   a model that represents at least the shape of a predetermined structure by a statistical characteristic amount obtained by performing predetermined statistical processing on a plurality of images representing the structure, and a weighting parameter for weighting the statistical characteristic amount according to an individual characteristic of the structure;
   a first parameter obtaining means for obtaining a value of a weighting parameter for representing the structure in an input image by applying the structure in the input image to the model;
   an image retouching means for retouching a portion of the structure in the input image;
   a second parameter obtaining means for obtaining a value of the weighting parameter for representing the portion of the structure in the input image before the retouching by applying the portion of the structure in the pre-retouching input image to the model;

a third parameter obtaining means for obtaining a value of the weighting parameter for representing the portion of the structure in the input image after the retouching by applying the portion of the structure in the post-retouching input image to the model;

a fourth parameter obtaining means for obtaining a value of the weighting parameter for representing the entire portion of the structure after the retouching is reflected to the entire portion of the structure by the model based on the value of the weighting parameter obtained by the first parameter obtaining means, and the variation from the value of the weighting parameter obtained by the second parameter obtaining means to the value of the weighting parameter obtained by the third parameter obtaining means; and an image reconstruction means for reconstructing an output image representing the structure after the retouching is reflected to the entire portion of the structure by substituting the value of the weighting parameter obtained by the fourth parameter obtaining means to the model.

2. An image processing apparatus, comprising:

an overall model that represents at least the shape of a predetermined structure by a statistical characteristic amount obtained by performing predetermined statistical processing on a plurality of images representing the entire portion of the structure, and an overall parameter for weighting the statistical characteristic amount according to an individual characteristic of the entire portion of the structure;

a partial model that represents at least the shape of the portion of the structure by a statistical characteristic amount obtained by performing predetermined statistical processing on a plurality of images representing the portion of the structure, and a partial parameter for weighting the statistical characteristic amount according to an individual characteristic of the portion of the structure;

a first parameter obtaining means for obtaining a value of an overall parameter for representing the structure in an input image by applying the structure in the input image to the overall model;

an image retouching means for retouching a portion of the structure in the input image;

a second parameter obtaining means for obtaining a value of a partial parameter for representing the portion of the structure in the input image before the retouching by applying the portion of the structure in the pre-retouching input image to the partial model a third parameter obtaining means for obtaining a value of the partial parameter for representing the portion of the structure in the input image after the retouching by applying the portion of the structure in the post-retouching input image to the partial model;

a fourth parameter obtaining means for obtaining a value of the overall parameter for representing the entire portion of the structure after the retouching is reflected to the entire portion of the structure by the overall model based on the value of the overall parameter obtained by the first parameter obtaining means, and the variation from the value of the partial parameter obtained by the second parameter obtaining means to the value of the partial parameter obtained by the third parameter obtaining means; and an image reconstruction means for reconstructing an output image representing the entire portion of the structure after the retouching is reflected to the entire portion of the structure by substituting the value of the overall parameter obtained by the fourth parameter obtaining means to the overall model.

3. The image processing apparatus according to claim 1, wherein:

the model is provided for each of a plurality of attributes of the predetermined structure; and the apparatus further comprises a selection means for obtaining an attribute of the structure in the input image, and selecting the model corresponding to the attribute.

4. The image processing apparatus according to claim 2, wherein:

at least either the overall model or the partial model is provided for each of a plurality of attributes of the predetermined structure; and the apparatus further comprises a selection means for obtaining an attribute of the structure in the input image, and selecting one of the plurality of overall models and/or partial models according to the obtained attribute.

5. The image processing apparatus according to claim 1, further comprising a detection means for detecting the structure in the input image.

6. The image processing apparatus according to claim 2, further comprising a detection means for detecting the structure in the input image.

7. The image processing apparatus according to claim 1, wherein the predetermined structure is a human face.

8. The image processing apparatus according to claim 2, wherein the predetermined structure is a human face.

9. The image processing apparatus according to claim 1, wherein the model and the application to the model are realized by the scheme of Active Appearance Model(s).

10. The image processing apparatus according to claim 2, wherein the model and the application to the model are realized by the scheme of Active Appearance Model(s).

11. The image processing apparatus according to claim 1, wherein the model and the application to the model are realized by the scheme of Active Shape Model(s).

12. The image processing apparatus according to claim 2, wherein the model and the application to the model are realized by the scheme of Active Shape Model(s).

13. An image processing method, comprising the steps of:

a first parameter obtaining step for obtaining a value of a weighting parameter for representing a predetermined structure in an input image by applying the structure in the input image to a model that represents at least the shape of the structure by a statistical characteristic amount obtained by performing predetermined statistical processing on a plurality of images representing the structure, and a weighting parameter for weighting the statistical characteristic amount according to an individual characteristic of the structure;

an image retouching step for retouching a portion of the structure in the input image;

a second parameter obtaining step for obtaining a value of the weighting parameter for representing the portion of the structure in the input image before the retouching by applying the portion of the structure in the pre-retouching input image to the model;

a third parameter obtaining step for obtaining a value of the weighting parameter for representing the portion of the structure in the input image after the retouching by applying the portion of the structure in the post-retouching input image to the model;

a fourth parameter obtaining step for obtaining a value of the weighting parameter for representing the entire portion of the structure after the retouching is reflected to the entire portion of the structure by the model based on the value of the weighting parameter obtained by the first parameter obtaining step, and the variation from the value of the weighting parameter obtained by the second parameter obtaining step to the value of the weighting parameter obtained by the third parameter obtaining step; and an image reconstruction step for reconstructing an output image representing the structure after the retouching is reflected to the entire portion of the structure by substituting the value of the weighting parameter obtained by the fourth parameter obtaining step to the model.

14. An image processing method, comprising the steps of:

a first parameter obtaining step for obtaining a value of an overall parameter for representing a predetermined structure in an input image by applying the structure in the input image to an overall model that represents at least the shape of the structure by a statistical characteristic amount obtained by performing predetermined statistical processing on a plurality of images representing the entire portion of the structure, and an overall parameter for weighting the statistical characteristic amount according to an individual characteristic of the entire portion of the structure;

an image retouching step for retouching a portion of the structure in the input image;

a second parameter obtaining step for obtaining a value of a partial parameter for representing the portion of the structure in the input image before the retouching by applying the portion of the structure in the pre-retouching input image to a partial model that represents at least the shape of the portion of the structure by a statistical characteristic amount obtained by performing predetermined statistical processing on a plurality of images representing the portion of the structure, and a partial parameter for weighting the statistical characteristic amount according to an individual characteristic of the portion of the structure;

a third parameter obtaining step for obtaining a value of the partial parameter for representing the portion of the structure in the input image after the retouching by applying the portion of the structure in the post-retouching input image to the partial model;

a fourth parameter obtaining step for obtaining a value of the overall parameter for representing the entire portion of the structure after the retouching is reflected to the entire portion of the structure by the overall model based on the value of the overall parameter obtained by the first parameter obtaining step, and the variation from the value of the partial parameter obtained by the second parameter obtaining step to the value of the partial parameter obtained by the third parameter obtaining step; and an image reconstruction step for reconstructing an output image representing the entire portion of the structure after the retouching is reflected to the entire portion of the structure by substituting the value of the overall parameter obtained by the fourth parameter obtaining step to the overall model.

15. A non-transitory computer readable recording medium on which an image processing program is recorded, the program causing a computer to perform the steps of:

a first parameter obtaining step for obtaining a value of a weighting parameter for representing a predetermined structure in an input image by applying the structure in the input image to a model that represents at least the shape of the structure by a statistical characteristic amount obtained by performing predetermined statistical processing on a plurality of images representing the structure, and a weighting parameter for weighting the statistical characteristic amount according to an individual characteristic of the structure;

an image retouching step for retouching a portion of the structure in the input image;

a second parameter obtaining step for obtaining a value of the weighting parameter for representing the portion of the structure in the input image before the retouching by applying the portion of the structure in the pre-retouching input image to the model;

a third parameter obtaining step for obtaining a value of the weighting parameter for representing the portion of the structure in the input image after the retouching by applying the portion of the structure in the post-retouching input image to the model;

a fourth parameter obtaining step for obtaining a value of the weighting parameter for representing the entire portion of the structure after the retouching is reflected to the entire portion of the structure by the model based on the value of the weighting parameter obtained by the first parameter obtaining step, and the variation from the value of the weighting parameter obtained by the second parameter obtaining step to the value of the weighting parameter obtained by the third parameter obtaining step; and an image reconstruction step for reconstructing an output image representing the structure after the retouching is reflected to the entire portion of the structure by substituting the value of the weighting parameter obtained by the fourth parameter obtaining step to the model.

16. A non-transitory computer readable recording medium on which an image processing program is recorded, the program causing a computer to perform the steps of:

a first parameter obtaining step for obtaining a value of an overall parameter for representing a predetermined structure in an input image by applying the structure in the input image to an overall model that represents at least the shape of the structure by a statistical characteristic amount obtained by performing predetermined statistical processing on a plurality of images representing the entire portion of the structure, and an overall parameter for weighting the statistical characteristic amount according to an individual characteristic of the entire portion of the structure;

an image retouching step for retouching a portion of the structure in the input image;

a second parameter obtaining step for obtaining a value of a partial parameter for representing the portion of the structure in the input image before the retouching by applying the portion of the structure in the pre-retouching input image to a partial model that represents at least the shape of the portion of the structure by a statistical characteristic amount obtained by performing predetermined statistical processing on a plurality of images representing the portion of the structure, and a partial parameter for weighting the statistical characteristic amount according to an individual characteristic of the portion of the structure;

a third parameter obtaining step for obtaining a value of the partial parameter for representing the portion of the structure in the input image after the retouching by applying the portion of the structure in the post-retouching input image to the partial model;

a fourth parameter obtaining step for obtaining a value of the overall parameter for representing the entire portion of the structure after the retouching is reflected to the entire portion of the structure by the overall model based on the value of the overall parameter obtained by the first parameter obtaining step, and the variation from the value of the partial parameter obtained by the second parameter obtaining step to the value of the partial parameter obtained by the third parameter obtaining step; and an image reconstruction step for reconstructing an output image representing the entire portion of the structure after the retouching is reflected to the entire portion of the structure by substituting the value of the overall parameter obtained by the fourth parameter obtaining step to the overall model.

* * * * *